(12) United States Patent
Biswas et al.

(10) Patent No.: US 12,248,387 B2
(45) Date of Patent: Mar. 11, 2025

(54) USER REACTION PREDICTION METHOD AND APPARATUS

(71) Applicant: Verizon Patent and Licensing Inc., Basking Ridge, NJ (US)

(72) Inventors: Subham Biswas, Thane (IN); Prashanth Veerapandian, Tamil Nadu (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 36 days.

(21) Appl. No.: 17/207,536

(22) Filed: Mar. 19, 2021

(65) Prior Publication Data
US 2022/0300392 A1    Sep. 22, 2022

(51) Int. Cl.
*G06F 11/34*    (2006.01)

(52) U.S. Cl.
CPC ...... *G06F 11/3438* (2013.01); *G06F 11/3452* (2013.01)

(58) Field of Classification Search
CPC .......................... G06F 11/3438; G06F 11/3452
See application file for complete search history.

(56) References Cited

U.S. PATENT DOCUMENTS

| | | | | |
|---|---|---|---|---|
| 6,785,649 B1 * | 8/2004 | Hoory | ...................... | G10L 13/08 704/235 |
| 8,839,093 B1 * | 9/2014 | Siroker | ................... | H04L 67/10 715/234 |
| 9,785,534 B1 * | 10/2017 | Paulus | ................ | G06F 11/3041 |
| 10,293,260 B1 * | 5/2019 | Evans | .................... | A63F 13/424 |
| 10,896,428 B1 * | 1/2021 | Balasubramaniam | ........................ | G10L 15/1815 |
| 2008/0270123 A1 * | 10/2008 | Levanon | ................. | G10L 17/26 704/E11.002 |
| 2010/0138775 A1 * | 6/2010 | Kohen | ................ | G06F 11/3041 715/781 |
| 2010/0174603 A1 * | 7/2010 | Hughes | .................. | G06Q 30/02 705/14.42 |
| 2010/0211865 A1 * | 8/2010 | Fanning | .............. | G06F 16/9577 715/234 |
| 2010/0211893 A1 * | 8/2010 | Fanning | .................... | G06F 8/38 715/760 |
| 2011/0078663 A1 * | 3/2011 | Huang | .................. | G06F 16/958 717/126 |
| 2011/0270771 A1 * | 11/2011 | Coursimault | ...... | H04N 1/00344 705/304 |
| 2012/0159345 A1 * | 6/2012 | Gonsalves | ............ | G06F 3/0482 715/745 |
| 2012/0233312 A1 * | 9/2012 | Ramakumar | .......... | G06Q 40/12 709/224 |

(Continued)

*Primary Examiner* — Justin R. Blaufeld

(57) ABSTRACT

Techniques for identifying user reaction in connection with an online application are disclosed. In one embodiment, a method is disclosed comprising obtaining activity data in connection with a user of an application, generating feature data using the obtained activity data, obtaining a user reaction prediction from a user reaction prediction model trained to output the user reaction prediction in response to the feature data. The user reaction prediction indicates a probability of the user reaction in connection with the application. A determination is made, using the user reaction prediction, whether or not to take a remedial action in connection with the user and the application.

17 Claims, 16 Drawing Sheets

(56) References Cited

U.S. PATENT DOCUMENTS

| | | | |
|---|---|---|---|
| 2013/0019173 A1* | 1/2013 | Kotler | G06F 3/04883 |
| | | | 715/834 |
| 2013/0132833 A1* | 5/2013 | White | G06F 3/048 |
| | | | 715/704 |
| 2013/0285927 A1* | 10/2013 | Pasquero | G06F 3/0237 |
| | | | 345/173 |
| 2014/0359584 A1* | 12/2014 | Chu | G06F 16/283 |
| | | | 717/131 |
| 2016/0180352 A1* | 6/2016 | Chen | G06Q 30/016 |
| | | | 705/7.29 |
| 2016/0217807 A1* | 7/2016 | Gainsboro | H04M 3/568 |
| 2016/0253311 A1* | 9/2016 | Xu | G06Q 50/01 |
| | | | 715/256 |
| 2017/0168924 A1* | 6/2017 | Dereszynski | H04L 43/50 |
| 2017/0286558 A1* | 10/2017 | Kelleher | G06F 11/323 |
| 2017/0315825 A1* | 11/2017 | Gordon | G06F 3/0346 |
| 2017/0364484 A1* | 12/2017 | Hayes | G06F 40/109 |
| 2018/0025743 A1* | 1/2018 | Childress | G10L 15/26 |
| | | | 704/205 |
| 2018/0089716 A1* | 3/2018 | Xu | G06Q 50/01 |
| 2018/0183929 A1* | 6/2018 | Fang | H04M 3/5166 |
| 2019/0121851 A1* | 4/2019 | Shires | G06F 40/279 |
| 2019/0130910 A1* | 5/2019 | Kariya | G10L 15/22 |
| 2019/0196932 A1* | 6/2019 | Adika | G06F 11/3438 |
| 2019/0373336 A1* | 12/2019 | Kim | H04N 21/233 |
| 2020/0005417 A1* | 1/2020 | Agasi | G06F 11/3438 |
| 2020/0125486 A1* | 4/2020 | Young | H04W 4/18 |
| 2020/0226418 A1* | 7/2020 | Dorai-Raj | G06F 16/313 |
| 2020/0312351 A1* | 10/2020 | Takahashi | G06F 3/167 |
| 2020/0394054 A1* | 12/2020 | Galoso | G06F 9/451 |
| 2021/0019213 A1* | 1/2021 | Mestres | G06F 11/3438 |
| 2021/0083961 A1* | 3/2021 | Polishchuk | H04L 43/08 |
| 2021/0326523 A1* | 10/2021 | Walters | G06F 16/345 |

* cited by examiner

|  | APPLICATION BEHAVIOR | | USER BEHAVIOR | | PAGE SEQUENCE | | VISIT INTENT & ACTION | |
|---|---|---|---|---|---|---|---|---|
| Activity | ErrorPage >0 | PageLoadTime >100 | PageSpentTime >60 | PageView >30 | PrevPage | CurrentPage | OrderPlaced | CartAdded |
| A1 | 0 | 2 | 90 | 90 | Product0 | Product1A | 0 | 0 |
| A2 | 2 | 112 | 5 | 0 | Product1A | Product1B | 0 | 0 |
| A3 | 3 | 253 | 6 | 0 | Product1B | Product2A | 0 | 0 |
| A4 | 0 | 31 | 75 | 80 | Product2A | Product2B | 0 | 0 |
| A5 | 0 | 3 | 5 | 60 | Product2B | Product3 | 1 | 1 |
| Total | -2.5 | -3 | 1 | 3 | Product0 Product1A Product1B Product2A Product2B | Product1A Product1B Product2A Product2B Product3 | Yes | Yes |

| | |
|---|---|
| ErrorPage | If the value is >0 (count), then convert each non-zero value to negative and determine the average of the resulting values, e.g., (-2-3)/2=-2.5. |
| PageLoadTime | If the value is >100 (seconds), then set the value to -1 for each increase by 100, e.g., 112 and 253 > 100 and contribute -1 and -2 (respectively) to the total. |
| PageSpentTime | If the value is >60 (seconds), then convert the value to +1 for each increase by 60, e.g., 75>60 and converts to +1. |
| PageView | If the value is >30 (percent of page viewed), then use +1 for each value > 30, e.g., 50, 80 and 60 are > 30, so the total value is +1+1+1=3. |
| PrevPage | The sequence of previously-viewed pages can be considered here. |
| CurrentPage | The sequence of currently-viewed pages can be considered here. |
| OrderPlaced | If an order was placed, then the value can be "YES", otherwise "NO". |
| CartAdded | If an item is placed in the cart, then the value can be "YES", otherwise "NO". |

Fig. 7

| No. | ACTIVITIES (1 OR MORE) | USER REACTION PREDICTION | PROBABILITY | ACTION TAKEN | EXPERIENCE |
|---|---|---|---|---|---|
| 1 | A1 | NONE | - | N | - |
| 2 | A1+A2 | FOCUSED | 40% | N | - |
| 3 | A1+A2+A3 | HESITANT | 56% | N | - |
| 4 | A1+A2+A3+A4 | HESITANT | 83% | Y | CHAT POP-UP / SMART SIMILARITIES |
| 5 | A1+A2+A3+A4+A5 | FRUSTRATED | 91% | Y | 1-CLICK PATH WITH EMPATHY |

Fig. 9

USER REACTION PREDICTION METHOD AND APPARATUS

BACKGROUND INFORMATION

A negative user experience with a website can result in the user limiting a current visit and any future visits to the website.

BRIEF DESCRIPTION OF THE DRAWINGS

FIG. 6 provides examples of activity data used in accordance with one or more embodiments of the present disclosure;

FIG. 7 provides exemplary guidelines for use in accordance with one or more embodiments of the present disclosure;

FIG. 9 provides an exemplary illustration of a sequence of activities and corresponding user reaction predictions and action determinations in accordance with one or more embodiments of the present disclosure;

DETAILED DESCRIPTION OF EXAMPLE EMBODIMENTS

Figure 1:
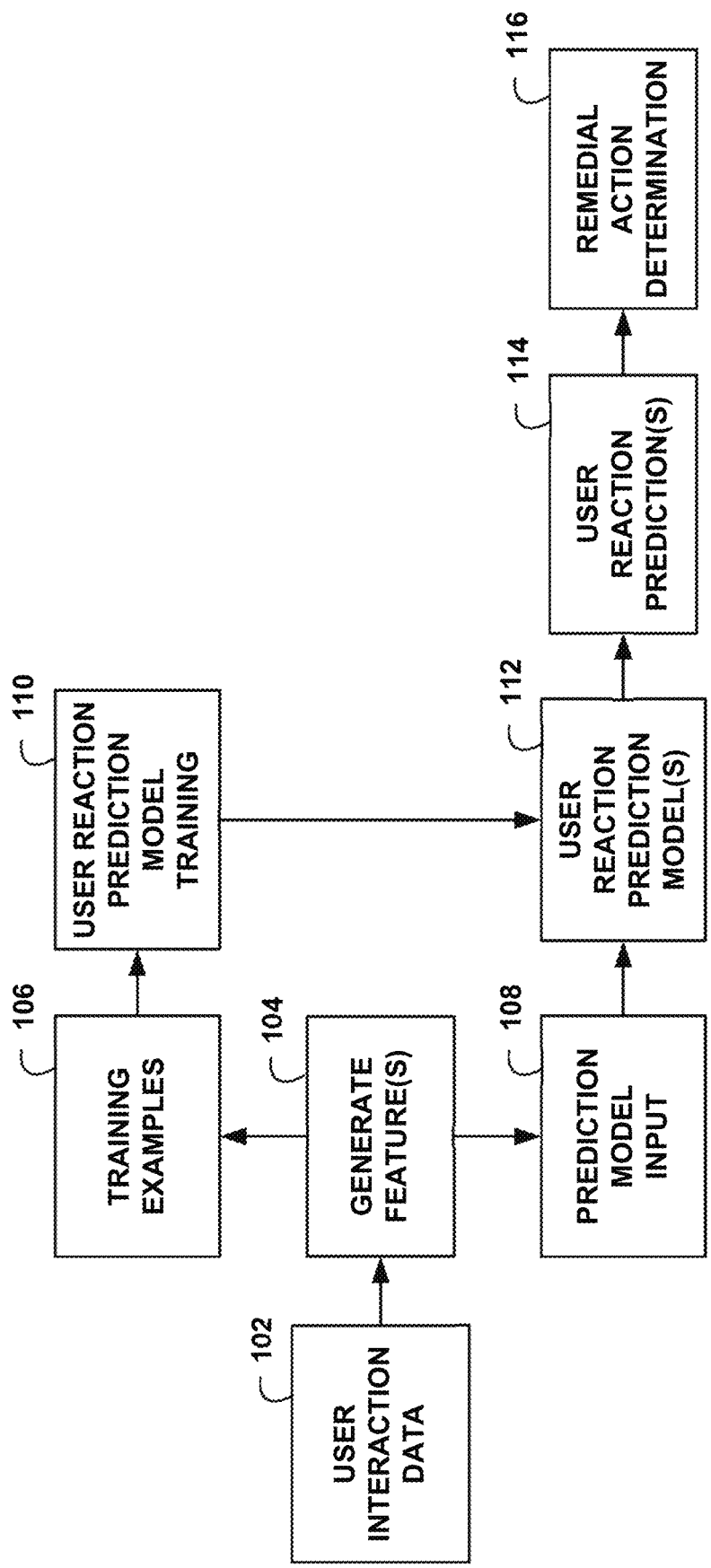
FIG. 1 provides an example illustrating user reaction prediction and intervention in accordance with one or more embodiments of the present disclosure.

The disclosed embodiments can be used in predicting a user's reaction to interactions with various online or offline channels, including an application, such as without limitation a web application, a mobile application, a chatbot or the like, evaluating and identifying the presence of a point of intervention and causing at least one corresponding intervention in a user's online (or offline) channel experience. Embodiments of the present disclosure can be used with an application executing on a client device (e.g., mobile, desktop, laptop, etc. device), an application accessible via an electronic network (e.g., an application executing on a remote device, such as a server or other computing device), or some combination thereof, which can involve a flow (or path) through pages, views, selections (e.g., link selections), etc. By way of a non-limiting example, user interaction with a channel might involve a clickstream of pages and links.

An online channel provided by a provider can include a number of pages and links, each of which are selectable by the user to access content (e.g., another experience, view, page, or the like, provided by the channel). Similarly, an offline channel provided by a provider can include user-selectable options requiring a response (e.g., an updated user interface display, updated view, etc.). At any point in the user's experience, the user can choose to either continue or discontinue the experience.

Generally, providers look to maximize the user experience of their various online channels, so as to increase customer satisfaction. By way of some non-limiting examples, the provider can be an electronic commerce (e-commerce) provider providing products for online purchase by a user. In such a case, one example of a successful user experience results in an online purchase by the user. By way of another non-limiting example, the provider might be motivated to retain users in an effort to maximize online advertising revenue. In any case, a user can develop a negative attitude after a bad experience with the channel, which can result in the user navigating away from the channel.

Unlike traditional brick and mortar experiences, it is impossible to personally observe a user or ascertain the user's reaction to an online or offline channel experience. The indicator of an inability to provide a successful experience for a user is typically only determined based on a lack of further input being received from the user.

The disclosed embodiments can be used to make one or more user reaction predictions and determine whether to take remedial action based on the user reaction prediction(s). In accordance with at least one embodiment, machine learning can be used to train one or more models to predict user reaction. In some embodiments, the model(s) use current activity to predict user reaction in the form of an emotion and a sentiment of a user, where emotion prediction can be indicative of a hesitant, focused or frustrated user reaction and sentiment can be indicative of a negative or positive user reaction. In accordance with at least one embodiment, each user reaction prediction can be determined using one or more trained models.

FIG. 1 provides an example illustrating user reaction prediction and intervention in accordance with one or more embodiments of the present disclosure. In the example shown in FIG. 1, user interaction data 102 can be used to generate feature(s) 104 used as training examples 106 by user reaction prediction model training 110 to generate user reaction prediction model(s) 112.

Embodiments of the present disclosure use historical user interaction data to train each user reaction prediction model 112. The historical user interaction data can involve multiple users and multiple channels (e.g., online and/or offline channels). By way of one non-limiting example, historical user interaction data can be obtained in connection with activities (e.g., page load and link selection activities) associated with the users and responses made by the channels to the users. In accordance with at least one embodiment, the historical user interaction data can be grouped by user and session and each data grouping can be used to generate a feature set used to train a model. As used herein, a session can be a group of interactions with a user in a given time frame, where the time frame can be a defined amount of time (e.g., 30 minutes).

In accordance with embodiments of the present disclosure, the user interaction data 102 can be current data (e.g., activity data associated with a current activity, a number of activities in a current session, etc.), which can be obtained and used with the user reaction prediction models 112 to detect a user reaction, or reactions, 114 (e.g., a current user reaction, or reactions). By way of some non-limiting examples, current data can be obtained in connection with a page load activity initiated by a web application (or other online channel) and/or in connection with a link selection by a user. The obtained activity data can include application behavior, user behavior, page sequence and intended result (or visit intent and action) data. As is discussed in more detail below, visit intent and action data relate to an intended result, or results, sought in connection with a user's experience. In accordance with one or more embodiments, a remedial action can be used to encourage an intended result.

In accordance with at least one embodiment, the current activity data (e.g., obtained in connection with a page load or link selection activity) can be the interaction data 102 used to generate feature(s) 104 (e.g., a feature dataset), which can be used as prediction model input 108 to the user reaction prediction model(s) 112. In accordance with one or more embodiments, the user reaction prediction model(s) 112 use the prediction model input 108 to generate user reaction prediction(s) 114. Each user reaction prediction 114 can indicate a probability of a user reaction in connection with a channel accessed by the user.

In accordance with at least one embodiment, a user reaction prediction 114 can be made in connection with a single activity or a combination of activities associated with a session. Remedial action determination 116 can use a probability threshold with each user reaction prediction 114 to determine whether or not to take remedial action. By way of a non-limiting example, a model 112 trained to predict, or detect, a user sentiment, can use feature dataset input generated from activity data to generate a probability indicating a level of frustration (as one example of a user reaction) of a user in connection with a channel. Remedial action can be taken if the probability (indicated by the user reaction prediction) satisfies a threshold probability of frustration. By way of further non-limiting illustration, the remedial action might be a popup chat dialog with a contextually-based message conveying empathy, or offering some type of incentive for a user to continue interacting with the web application (or other channel).

In one or more embodiments, user response to the remedial action can be fed (as prediction model input 108) into one or more trained models (e.g., the user reaction prediction model(s) 112) to determine whether the remedial action was effective at improving the user experience. If indicated, further remedial action, or actions, can be taken. In addition, the determined efficacy, or effectiveness, of the remedial action can be used in determining future remedial action(s).

In accordance with one or more embodiments, an association can be formed between a predicted user reaction and one or more remedial actions used in response. The association can be stored in a data structure, such as one or more tables (e.g., of a relational database), etc. A formed association can be used to select the remedial action(s) to use as an intervention.

Figure 2:
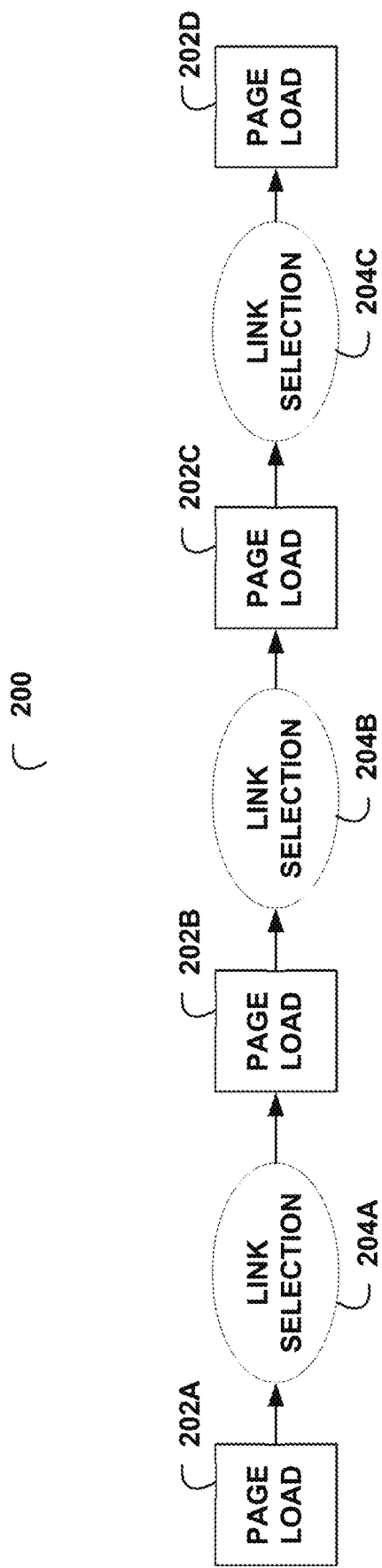
FIG. 2 provides an example illustrating activity in accordance with one or more embodiments of the present disclosure.

FIG. 2 provides an example illustrating activity according to at least one embodiment of the disclosure. In the example, path 200 includes page load and link selection activities. Path 200 might constitute a web session, or be a portion of a web session in connection with a user of a web application, for example. In the example shown in FIG. 2, stages 202A, 202B, 202C and 202D involve a page load activity and stages 204A, 204B and 204C involve link selection activity. In accordance with one or more embodiments, a page load activity can involve a web application causing a web page definition to be transmitted to a user computing device for display at the user computing device. By way of a non-limiting example, a web application can cause the display of a web page by transmitting a web page document to a browser application executing at the user computing device in response to a request for the web page from the browser application.

In accordance with some embodiments, link selection activity can include a web page request, e.g., a web page request resulting in a page load activity. By way of some non-limiting examples, a web page request can occur as a result of a user entering a web page's web address (e.g., a universal resource locator (URL)) in an input field of a browser application executing on the user's computing device, the user selecting a web page link (e.g., a hyperlink), etc. By way of some further non-limiting examples, a link might be included in an electronic message displayed at the user's computing device, included in a web page displayed by the browser, included in a set of search results displayed by the browser, etc.

By way of a further non-limiting example, a page load activity might include an application displaying a new or updated user interface component, and a link selection might involve user selection of a user interface option that results in the page load activity.

In accordance with one or more embodiments, a channel (e.g., an application) can respond to the input received from the user by causing a page to be loaded (e.g., by a browser or other application) at the user's computing device. By way of a non-limiting example, a web application can cause an electronic document containing a definition of a web page requested by the user to be transmitted via an electronic communications network to a browser application executing at the user's computing device. The browser application can parse the document and generate a display at the user's computing device in response.

In some embodiments, activity data can be obtained at each stage in path 200. In a user prediction model training phase, a corpus of activity data can be obtained and used to train each user reaction prediction model. In a scoring phase, activity data associated with an activity (e.g., a page load activity, a link selection activity, etc.) can be obtained and used to generate a feature dataset, which can be input to the trained user reaction prediction model(s) to generate the user reaction prediction(s). Each user reaction prediction can be used in making a determination whether or not to intervene with one or more remedial actions, or measures.

In the example shown in FIG. 2, path 200 is exemplary of an experience with an application including a number of page load and link selection activities. By way of a non-limiting example, path 200 shown in the example of FIG. 2 can be a digital purchase path in connection with an e-commerce application and involving a straightforward activity set commencing with an initial page loading activity (at stage 202A) and progressing through a number of link selection activities (at stages 204A, 204B and 204C), each with a corresponding page load activity (at stages 202B, 202C and 202D). In the example of FIG. 2, path 200 concludes with a page loading activity (at stage 202D). By way of one non-limiting example and in the case of a digital purchase path, the page loading activity at stage 202D can involve the loading of a checkout page, with which the user can finalize a product purchase. In such a case, the checkout page can be an example of an intended result in a digital purchase path. Path 200 provides an example for which associated user reaction predictions are not indicative of any remedial measures.

Figure 3:
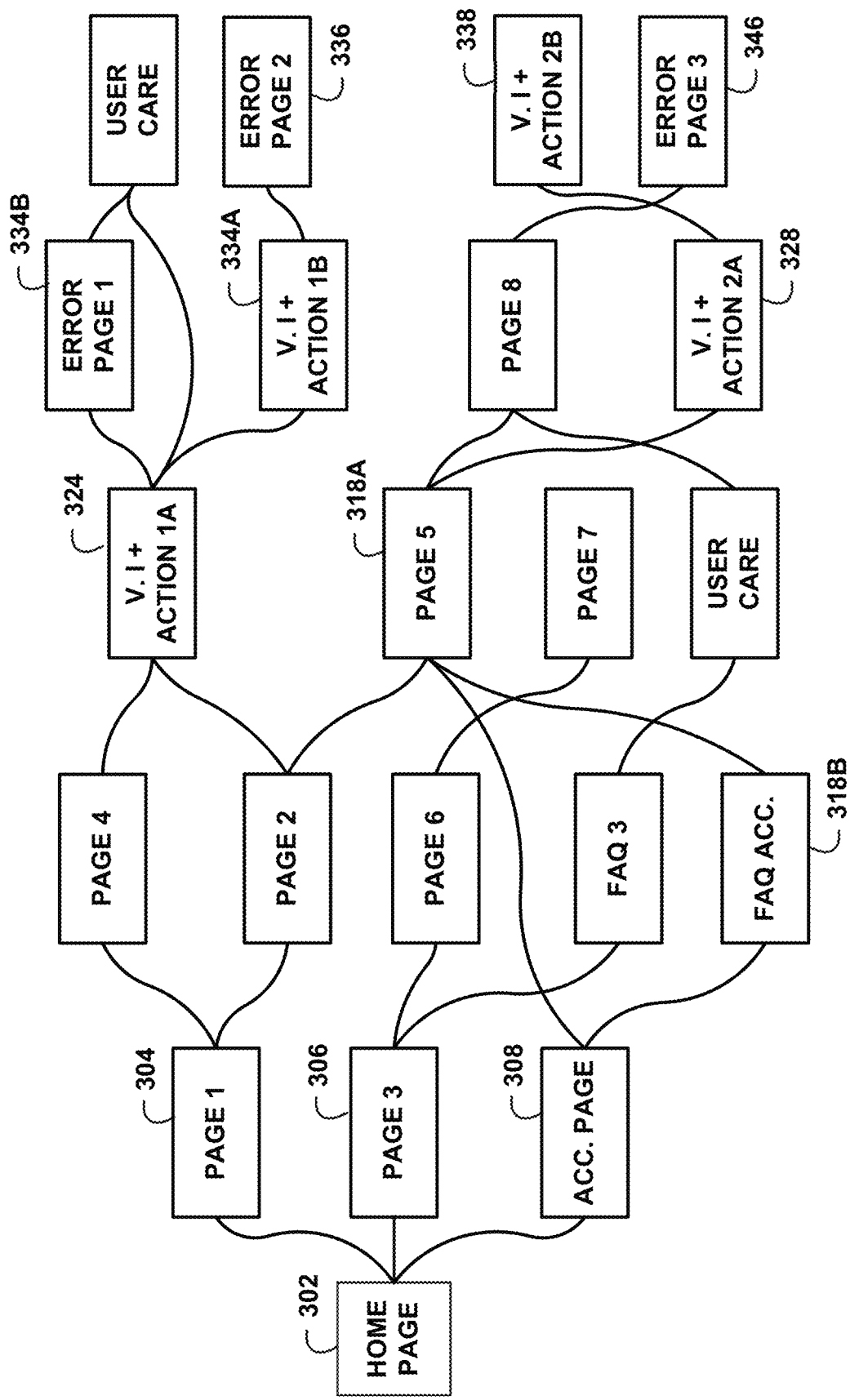
FIG. 3 provides another example illustrating activity in accordance with one or more embodiments of the present disclosure.

FIG. 3 provides another example illustrating activity in accordance with one or more embodiments of the disclosure. The example shown in FIG. 3 illustrates some complex flows of activity involving a number of paths branching from stage 302 that might be taken in connection with a user and an application, or other type of channel. In the example, stage 302 involves loading a home page, which includes multiple user-selectable links corresponding to stages 304, 306 and 308. Stages 304, 306 and 308 include a page load activity and a number of user-selectable links available from each web page loaded at each of these stages.

Like path 200 (of FIG. 2), a path involving stages 302, 308, 318A, 328 and 338 might have associated user reaction predictions that are not indicative of any remedial measures, as the path progresses to an intended result. In some embodiments, an intended result can be a user completing a purchase, and an intended result can include one or more items being added to a digital shopping cart and an order for the item(s) in the cart being placed by a user. Other examples of an intended result include without limitation content selection in connection with a digital content application, selecting a recommendation in connection with an item recommendation application, search result item selection in connection with a search application, etc.

In some embodiments, paths shown in the example of FIG. 3 can be product purchase paths, each of pages 1-8 can be a product page and stages 324, 328, 334A and 338 correspond to an intended result. By way of a non-limiting example, examples of an intended result in connection with a product purchase path can include adding a product to the cart (e.g., stages 324 and 328) and ordering the product(s) placed in the cart (e.g., stages 334A and 338). In the example shown in FIG. 3, stage 308 can involve an account page being loaded and displayed at the user computing device, stages 318A and 328 can involve loading and displaying product pages, and stages 328 and 338 can involve (respectively) loading a page including an electronic cart in which a product is being added to the cart and a product purchase page in which contents of the cart are purchased.

Stages 334B, 336 and 346 involve an error in a page loading activity. As is discussed in more detail below, application behavior is a factor in determining user reaction and whether or not to intervene with remedial action. In the example shown in FIG. 3, an error can occur at any stage along a path. In the example shown in FIG. 4, an error follows stages 324 and 334A, both of which involve an intended result. At each of the stages 334B, 336 and 346, intervention may be warranted depending on a predicted user reaction.

As is discussed in more detail below, page sequence can be a factor in predicting user reaction and determining whether or not to take remedial action. By way of a non-limiting example and in the example shown in FIG. 3, activity data obtained at each stage in the sequence of pages loaded at stages 302, 308 and 318B, 328 and 338 can be used in predicting user reaction. By way of a further non-limiting example, activity data obtained at each stage in the sequence of pages loaded at stages 302, 308 and 318A, 328 and 338 can be obtained and used in predicting user reaction.

Figure 4:
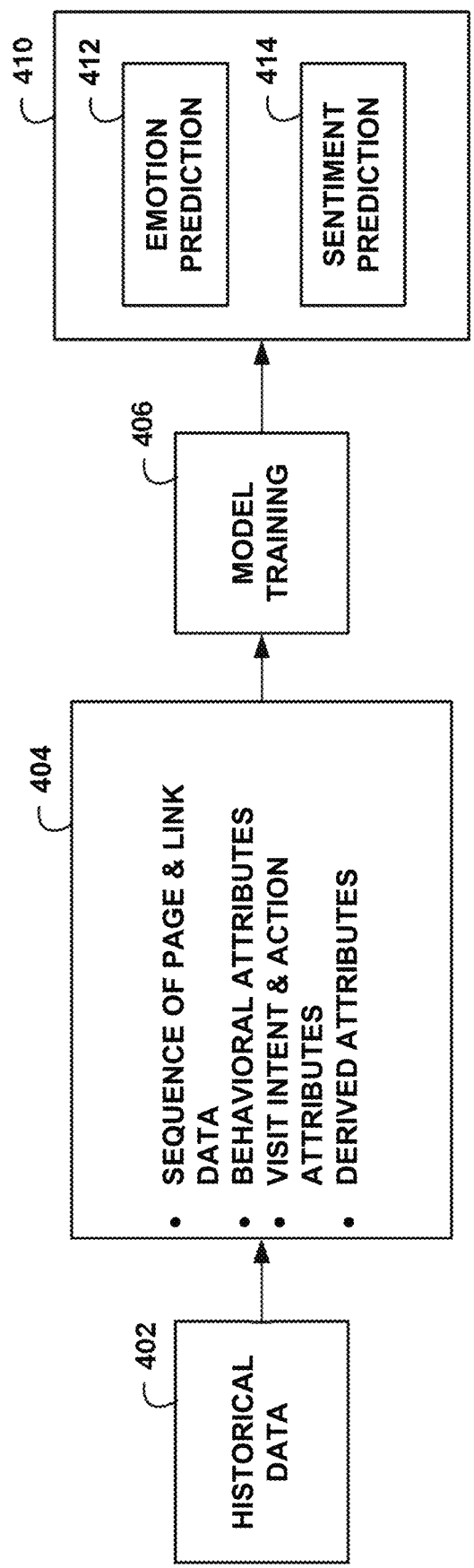
FIG. 4 provides an exemplary model training illustration in accordance with one or more embodiments of the present disclosure.

In accordance with one or more embodiments, a user reaction prediction is provided by one or more user reaction prediction models trained using training data and one or more machine learning algorithms. FIG. 4 provides an exemplary model training illustration in accordance with one or more embodiments of the present disclosure. At block 402, historical data can be obtained. By way of a non-limiting example, historical data can be obtained from a number of user sessions involving a number of users. By way of a non-limiting example, historical data can be a corpus of activity data associated with one or more channels and users.

At block 404, the historical data can be used to generate training data that becomes input to block 406. At model training block 406, one or more statistical, machine-trained models can be generated using the training data input to block 406. Each model generated at block 406 can be trained to output at least one user reaction prediction indicating a probability of a user reaction in connection with an application. Block 410 provides examples of two models that can be generated at block 406. In the example shown in FIG. 4, the model training performed at block 406 can generate an emotion prediction (or scoring) model 412 for use in predicting an emotion type of a user reaction and a sentiment prediction (or scoring) model 414 for use in predicting a sentiment type of a user reaction.

In accordance with one or more embodiments, emotion prediction model 412 can be trained to detect and predict an emotion type of a user reaction, including hesitancy, focus and frustration. In accordance with one or more embodiments, sentiment prediction model 414 can be trained to detect and predict a sentiment type of a user reaction, including positive and negative sentiments.

In the example shown in FIG. 4, block 410 includes two models, one for sentiment prediction and one for emotion prediction. Block 410 can comprise any number of models. By way of a non-limiting example, models 412 and 414 can be a single model that can make both sentiment and emotion predictions. By way of another non-limiting example, emotion model 412 can be multiple models with each model corresponding to an emotion, and model 414 can be multiple models with each one corresponding to a sentiment. Additionally and while block 410 includes models that can predict sentiment and emotion, other models can be trained (and used) to predict or detect other types of user reactions.

In the example shown in FIG. 4, block 404 provides some examples of the historical data that can be used as input to model training at block 406. The examples include page and link sequence data, behavioral attributes (e.g., user and application behavioral attributes), visit intent and action (or intended result) attributes and derived attributes.

Figure 5:
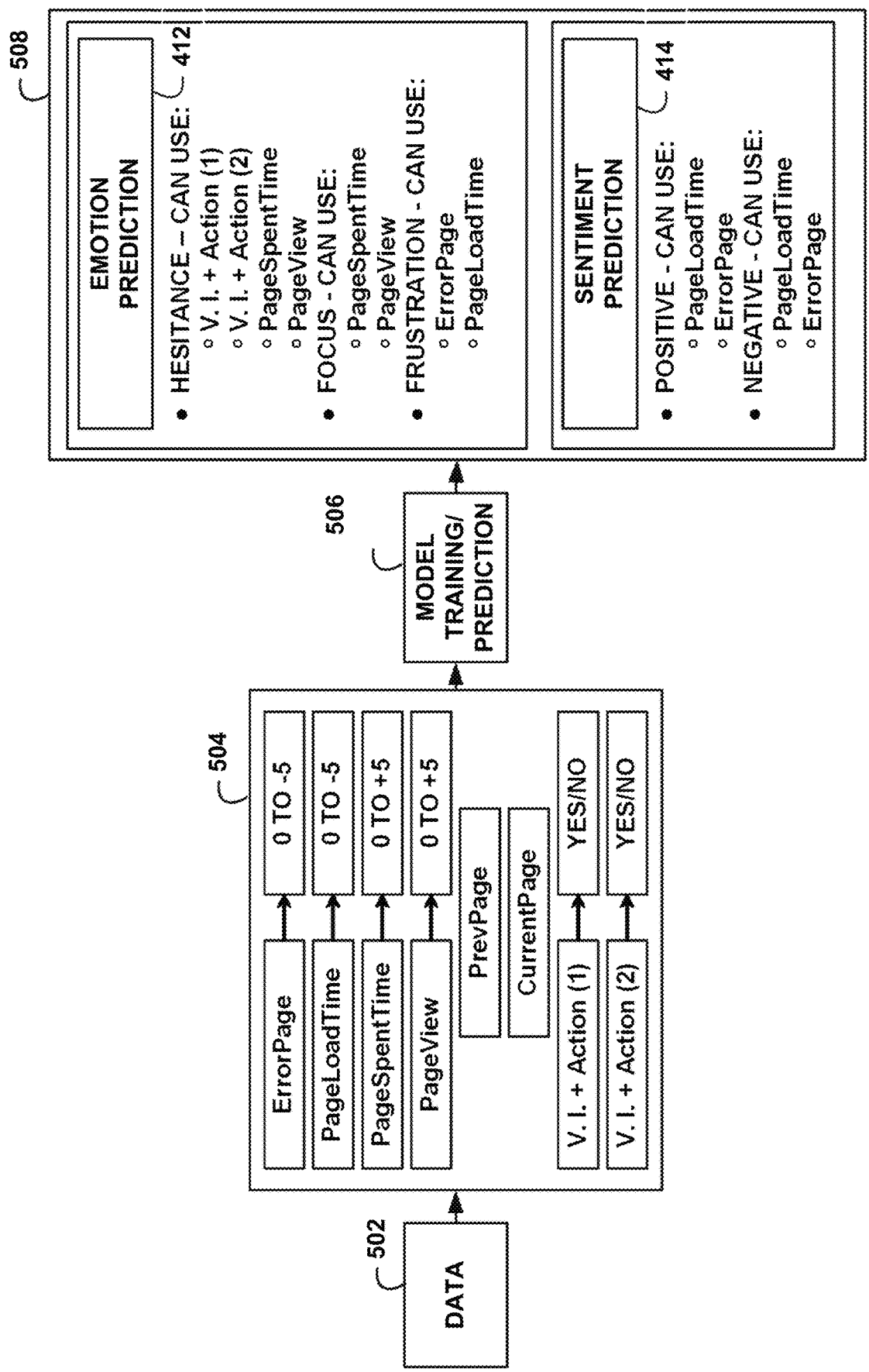
FIG. 5 provides an attribute derivation example in accordance with one or more embodiments of the present disclosure.

In accordance with one or more embodiments, attributes (or attribute data) can be derived from historical data (e.g., historical data obtained in connection with block 402 of FIG. 4) and (as is discussed in more detail below) from current (or real-time) data. Current data can be activity data obtained in connection with a current user of an application. FIG. 5 provides an attribute derivation example in accordance with one or more embodiments of the present disclosure. In the example shown in FIG. 5, data at block 502 can be historical data or current data.

In the example shown in FIG. 5, at data block 504, the data can comprise ErrorPage, PageLoadTime, PageSpentTime, PageView, PrevPage, CurrentPage, and V.I.+Action (1) and (2) data. In the example shown, ErrorPage, PageLoadTime, PageSpentTime and Pageview data can be numerical values. In accordance with one or more embodiments, a positive impact on user reaction can be reflected using a positive numerical value (or range of values) and a negative impact on user reaction can be reflected using a negative numerical value (or range of values).

For example, an error occurring with a page load (or ErrorPage) has a negative impact on user reaction, which can be reflected in the range of values including negative values associated with the ErrorPage data. By way of a further non-limiting example, an amount of time spent by a user viewing a page can have a positive impact on user reaction, which can be reflected in the range of values including positive values associated with PageSpentTime data.

In the example of FIG. 5, data used in block 504 can include one or more intended result data items (labeled "V.I. Action (1)" and "V.I.+Action (2)" in the example), each of which can be assigned a positive indicator (e.g., a value of "Yes") or a negative indicator (e.g., a value of "No"). In the example shown in FIG. 5, there are two intended result data items. It should be apparent that the number of intended result data items can vary. By way of one non-limiting example, in a product purchase scenario, the intended result data items can correspond to "cart added" and "product purchased" intended results, and the values can include a positive indicator corresponding to an occurrence of an intended result or a negative indicator corresponding to an absence of the intended result.

In accordance with one or more embodiments, data input to block 504 can be used to generate data input to model training/prediction training block 506. As is discussed in more detail below, the data input to block 506 can comprise one or more feature datasets generated at block 504 using the data input to block 504 from block 502. Block 504 provides examples of feature data input, including ErrorPage, PageLoadTime, PageSpentTime, PageView, PrevPage, CurrentPage, V.I.+Action (1) and V.I.+Action (2). In the example shown in FIG. 5, the ErrorPage and PageLoadTime feature data can have an associated data range of 0 to −5, the PageSpentTime and PageView feature data can have an associated data range of 0 to +5, and the V.I.+Action (1) and V.I.+Action (2) feature data can have a positive (e.g., "YES") data value or a negative ("NO") data value.

As shown in the example, data input from block 504 to block 506 can be used either to train one or more user reaction prediction model(s) in the case that the data is historical data or it can be used as input to one or more trained user reaction prediction models to obtain one or more user reaction predictions in the case that the data is current data intended for use in predicting a current user's reaction.

Block 508 provides examples of data (or feature data) that can be used by each of models 412 and 414 in accordance with one or more embodiments. In the example, emotion model 412 can use PageSpentTime and PageView feature data in predicting focus, use intended result(s) (e.g., V.I.+ Action (1), V.I.+Action (2)), PageSpentTime and PageView feature data in predicting hesitance, and use ErrorPage and PageLoadTime feature data in predicting frustration. In the example, sentiment model 414 can use PageLoadTime and ErrorPage feature data in making positive and negative sentiment predictions.

FIG. 6 provides examples of feature data associated with each of a number of activities in accordance with one or more embodiments of the present disclosure. In the example shown in FIG. 6, each column includes a header indicating a type of feature data, rows labeled A1-A5 correspond to an activity (e.g., a page load activity, a link selection, etc.) and the row 602 (which is labeled "Total") provides an example of derived attributes (or derived attribute data). In accordance with one or more embodiments, a feature dataset can comprise ErrorPage, PageLoadTime, PageSpentTime, PageView, PrevPage, CurrentPage and intended result (e.g., V.I.+Action (1), V.I.+Action (2)) data values, as illustrated in row 602. As shown in the example, the values in row 602 can be derived from the activity data in one or more of the rows labeled A1-A5.

In accordance with one or more embodiments, activity data can be associated with a number of factors used in predicting user reaction. In the example shown in FIG. 6, application behavior can be one factor and can be represented using ErrorPage and PageLoadTime data. User behavior can be another factor which can be represented using PageSpentTime and PageView data. Page sequence can be another factor and can be represented by a pair of page identifiers indicating a page sequence comprising a previous page (PrevPage) and a current page (CurrentPage). Intended result (e.g., V.I.+Action (1) and V.I.+Action (2)) can be another factor. In the example shown in FIG. 6, an intended result in connection with an e-commerce application can include an item added to a digital cart and an order being placed.

In the example shown in FIG. 6, the derived attribute dataset shown in row 602 is determined using the activities associated with activities A1-A5. Determination of the derived attribute dataset shown in row 602 is discussed in more detail below in connection with FIG. 7.

In accordance with at least one embodiment, each value in the rows labeled "A1-A5" and under the ErrorPage column heading can be a count (e.g., zero or a non-zero, non-negative value) of the number of page errors occurring in connection with a respective one of the activities, each value in the same rows and under each of the PageLoadTime and PageSpentTime column headings can be a temporal unit (e.g., seconds), and each value in the same rows and under the PageView column heading can be a percentage. In accordance with one or more embodiments, the temporal measurements for PageLoadTime and PageSpentTime can indicate (respectively) an amount of time taken to load a page and an amount of time a user spent viewing a page. The percentage associated with PageView can be an indicator of the amount of a page displayed, or viewed.

In accordance with one or more embodiments, rows "A1-A5" can include previous and current page information for an activity, as shown under the PrevPage and Current-Page column headings. As discussed and in accordance with one or more embodiments, each intended result (e.g., Order-Placed and CartAdded) can have a binary value (e.g., "Yes" or "No", or "1" or "0"). In the example shown in FIG. 6, a value of "1" can indicate an occurrence of an intended result, and a value of "0" can indicate an absence of an intended result.

In accordance with one or more embodiments, values in the row 602 can be derived using activity data. FIG. 7 provides exemplary guidelines for use in accordance with one or more embodiments of the present disclosure. The guidelines illustrated in FIG. 7 can be used in aggregating data to generate each value in row 602 of FIG. 6.

In the example shown in FIGS. 6 and 7, an aggregate of the ErrorPage values associated with activities A1-A5 can be determined as follows:

If the value is >0 (count), then convert each non-zero value to negative and determine the average of the resulting values, e.g., (−2−3)/2=−2.5.

In other words, the ErrorPage values associated with activities A1-A5 can be determined by converting each non-zero value to a negative value (e.g., convert the ErrorPage value associated with activity A2 from 2 to −2) and then taking an average of a sum of the resulting negative value(s). The activity data associated with activities A1-A5 in FIG. 6 and the guidelines shown in FIG. 7 can be used to generate a resulting error page aggregate values of −2.5. In accordance with one or more embodiments, a data range (e.g., 0 to −5) can be used with the ErrorPage aggregate value.

In the example shown in FIGS. 6 and 7, an aggregate of the PageLoadTime values associated with activities A1-A5 can be determined as follows:

If the value is >100 (seconds), then set the value to −1 for each increase by 100, e.g., 112 and 253>100 contribute −1 and −2 (respectively) to the total.

By way of further illustration, an aggregate of the PageLoadTime values associated with activities A1-A5 can be determined by selecting each value that exceeds a temporal threshold (e.g., 100 seconds), converting each selected value to a negative number corresponding to each increase of the temporal threshold and aggregating the resulting value(s). FIGS. 6 and 7 provide a resulting total value of −3 using the exemplary activity data values associated with activities A1-A5. In accordance with one or more embodiments, a data range (e.g., 0 to −5) can be used with the PageLoadTime aggregate value.

Continuing with the example shown in FIGS. 6 and 7, an aggregate of the PageSpentTime values associated with activities A1-A5 can be determined as follows:

If the value is >60 (seconds), then convert the value to +1 for each increase by 60, e.g., 75>60 and converts to +1.

In other words, in the example shown, an aggregate of the PageSpentTime values associated with activities A1-A5 can be determined by selecting each value that exceeds a temporal threshold (e.g., 60 seconds), converting each selected value to a positive number corresponding to each increase of the temporal threshold and aggregating the resulting value (s). FIGS. 6 and 7 provide a resulting total value of +1 using the exemplary PageSpentTime data values associated with activities A1-A5. In accordance with one or more embodiments, a data range (e.g., 0 to +5) can be used with the PageSpentTime aggregate value.

In the example shown in FIGS. 6 and 7, an aggregate of the page view values associated with activities A1-A5 can be determined as follows:

If the value is >30 (percent of page viewed), then use +1 for each value >30, e.g., 50, 80 and 60 are >30, so the total value is +1+1+1=3.

By way of a further illustration using the example shown, an aggregate of the PageView values associated with activities A1-A5 can be determined by selecting each value that exceeds a percentage of a page view threshold (e.g., 30 percent) and converting each selected value to a positive number corresponding to each increase of the percent threshold. FIGS. 6 and 7 provide a resulting PageView total value of +3 using the exemplary activity data values associated with activities A1-A5. In accordance with one or more embodiments, a data range (e.g., 0 to +5) can be used with the PageView aggregate value.

With respect to the PrevPage and CurrentPage, the corresponding value is an aggregate of current and previous page sequences (or pairings) associated with each of the activities A1-A5 in the example shown in FIGS. 6 and 7. As shown in the example of FIG. 7, a sequence of previously-viewed pages can be considered in determining an aggregate PrevPage value, and a sequence of currently-viewed pages can be considered in determining an aggregate CurrentPage value.

The aggregate for each intended result (e.g., OrderPlaced and CartAdded) can indicate an occurrence or absence (or lack of an occurrence) of a respective intended result. In the example shown in FIG. 7, if an order is placed, then the aggregate value associated with OrderPlaced can be "YES", otherwise "NO," and if an item is placed in the cart, then the aggregate value associated with CartAdded can be "YES", otherwise "NO". In the example shown in FIGS. 6 and 7, the aggregate result indicates an occurrence of each intended result.

Figure 8:
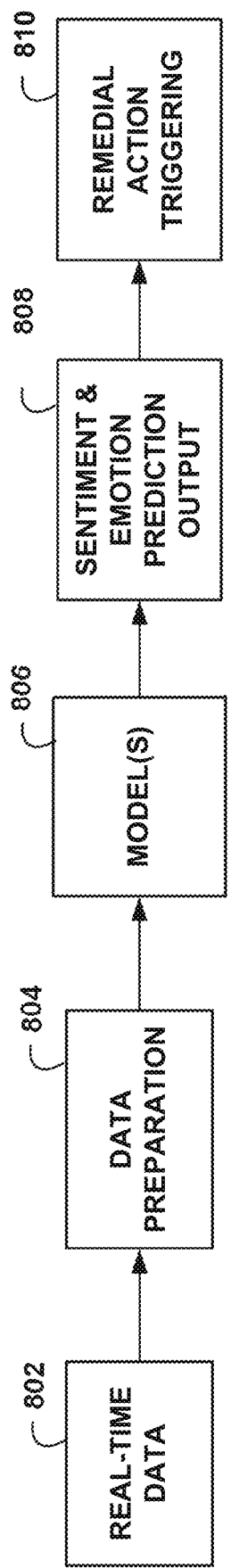
FIG. 8 provides an example of a model scoring illustration in accordance with one or more embodiments of the present disclosure.

FIG. 8 provides an example of a model scoring illustration in accordance with one or more embodiments of the present disclosure. In the example shown in FIG. 8, real-time can refer to current data received in connection with an activity (e.g., a page load activity, a link selection activity, etc.) in connection with a user and an application. In accordance with at least one embodiment, blocks 802, 804, 806, 808 and 810 can be performed, or provided, by a provider's computing device (e.g., a server hosting an application, a computing device executing the provider's application, a user's computing device, etc.).

In accordance with one or more embodiments, at real-time data block 802, the current activity data at block 802 can be received by the computing device from a user computing device. By way of one non-limiting example, the activity data can be received via a browser application (or other application) executing at the user's computing device. The current activity data can indicate whether or not an ErrorPage(e.g., an error during the loading of a page) occurred, a PageLoadTime (e.g., an amount of time that it took to load the page, a PageSpentTime (e.g., an amount of time that a user spent with a page, a PageView (e.g., an amount of a page displayed), and any intended result data (e.g., CartAdded and/or OrderPlaced indicating, respectively an addition to a digital cart and a purchase transaction).

At data preparation block 804, activity data can be used to generate model input (e.g., a feature dataset). In addition, the activity data can be saved and used as training data for model training (e.g., to update an existing model, train a new model, etc.). As model input, a feature dataset generated using the activity data can be used to make one or more user reaction predictions (e.g., sentiment and emotion predictions). In accordance with one or more embodiments, model input can be generated in response to each activity (e.g., page load, link selection, etc. activity) of interest.

FIG. 9 provides an exemplary illustration of a sequence of activities and corresponding user reaction predictions and action determinations in accordance with one or more embodiments of the present disclosure. In the example shown in FIG. 9, a user reaction prediction can be generated in connection with each activity, A1-A5. For the purpose of further illustration, it is assumed that the labeled A1-A5 in the example of FIG. 9 correspond to the activities labeled A1-A5 in the example of FIG. 6.

With respect to a first activity, A1, which might be an initial page load activity at the start of a user's interaction with an online or offline channel, model input can be generated using data obtained in connection with the activity. By way of a non-limiting example and with reference to FIG. 6, activity, A1, can be used to generate model input (e.g., a feature dataset) in accordance with the guidelines shown in FIG. 7 and the activity data from activity A1. At this point in the example, activities A2-A5 have yet to occur and are not included in the model input generation.

In accordance with one or more embodiments, model input from a previous activity can be used in generating model input for a current activity. Referring again to the example of FIGS. 6 and 9, model input for a next activity, A2, can be generated using activity data gathered in connection with activities A1 and A2. By way of a non-limiting example and referring again to FIG. 6, model input for activity, A2, can be determined using the guidelines shown in FIG. 7 with the activity data associated with activities A1 and A2. This approach can be used with each succeeding activity A3-A5.

With reference to FIG. 8, the model input generated at data preparation block 804 can be input to the trained model(s) 806 (e.g., each model trained at block 406 of FIG. 4) to generate sentiment and emotion prediction output 808. In accordance with one or more embodiments, the model output 808 includes one or more user reaction predictions, which can include a sentiment prediction and an emotion prediction. Each prediction can indicate a probability (or likelihood) of an actual user reaction in connection with a user.

By way of a non-limiting example and in the case of a sentiment prediction, model output 808 can include at least one value indicating a probability of a positive or negative reaction given the model input. By way of another non-limiting example, model output 808 can include a probability for each sentiment, one probability for both sentiments, etc. By way of a non-limiting example and in the case of an emotion prediction, model output 808 can include at least one value for each emotion indicating a likelihood of the emotion in view of the model input from data preparation block 804.

At remedial action triggering block 810, the model output 808 can be used to make a determination whether or not to intervene and take remedial action. In accordance with one or more embodiments, the determination can be made using a probability threshold corresponding to each user reaction. By way of a non-limiting example, a probability threshold can be used with a probability of a user reaction to determine whether to intervene and take one or more remedial actions.

Referring again to the example shown in FIG. 9, a user reaction is identified in connection with model input from activities A1 and A2, at which point a focused user reaction is identified with a probability of 40%. However and in the example shown in FIG. 9, the probability generated by the emotion prediction model can be insufficient (e.g., as determined using a focused probability threshold value) to warrant a remedial action. In the example and in connection with activities A1-A3, a 56% probability of a hesitant user reaction is detected by a trained emotion detection model; however, the model output probability can be insufficient to warrant remedial action.

In the example shown in FIG. 9, model input generated from data collected in connection with activities A1-A4 yields model output indicating an 83% probability of a hesitant user reaction. The probability is determined to warrant remedial action (e.g., the probability output by a trained emotion user reaction prediction model satisfies a threshold probability).

By way of a non-limiting example, a pop-up window (e.g., a chat dialog window) can be caused to be displayed (by the application) at the user's computing device. By way of a further non-limiting example, the user can be presented with one or more recommendations (e.g., one or more item recommendations), which can be based on the user's browsing behavior (e.g., recommend one or more products based on similar products browsed by the user). The recommendation(s) can be made in a pop-up window, a banner, etc. By way of another non-limiting example and in the case of a smart device purchase path being provided via the application, the recommendations can include contextual recommendations of devices, plans and/or services that can be based on user browsing intents.

By way of another non-limiting example, a remedial action, or actions, include causing a display (e.g., in a chat popup, dialog, etc.) of additional information related to content of one or more views (e.g., a currently-displayed web page or a set of web pages displayed at the user computing device, a mobile application user interface display, etc.). As yet another non-limiting example, a remedial action can include providing one or more user-selectable options (e.g., links) offering a streamlined completion of the intended result, such as a 1-click option. The option can be provided in the browser or made via an electronic message (e.g., electronic mail message, Short Messaging Service (SMS) message, etc.).

In the example shown in FIG. 9, a 91% probability level of frustration is detected from model input generated using data obtained in connection with activities A1-A5, and remedial action in the form of a 1-click option can be displayed along with some message indicating empathy for the user's experience.

Referring again to FIG. 8 and in accordance with one or more embodiments, one or more remedial actions can be taken (e.g., at block 810 of FIG. 8). One or more of the exemplary actions described herein can be combined together and/or one or more other remedial actions can be taken. Embodiments of the present disclosure are not limited by the examples of remedial actions provided herein.

Figure 10:
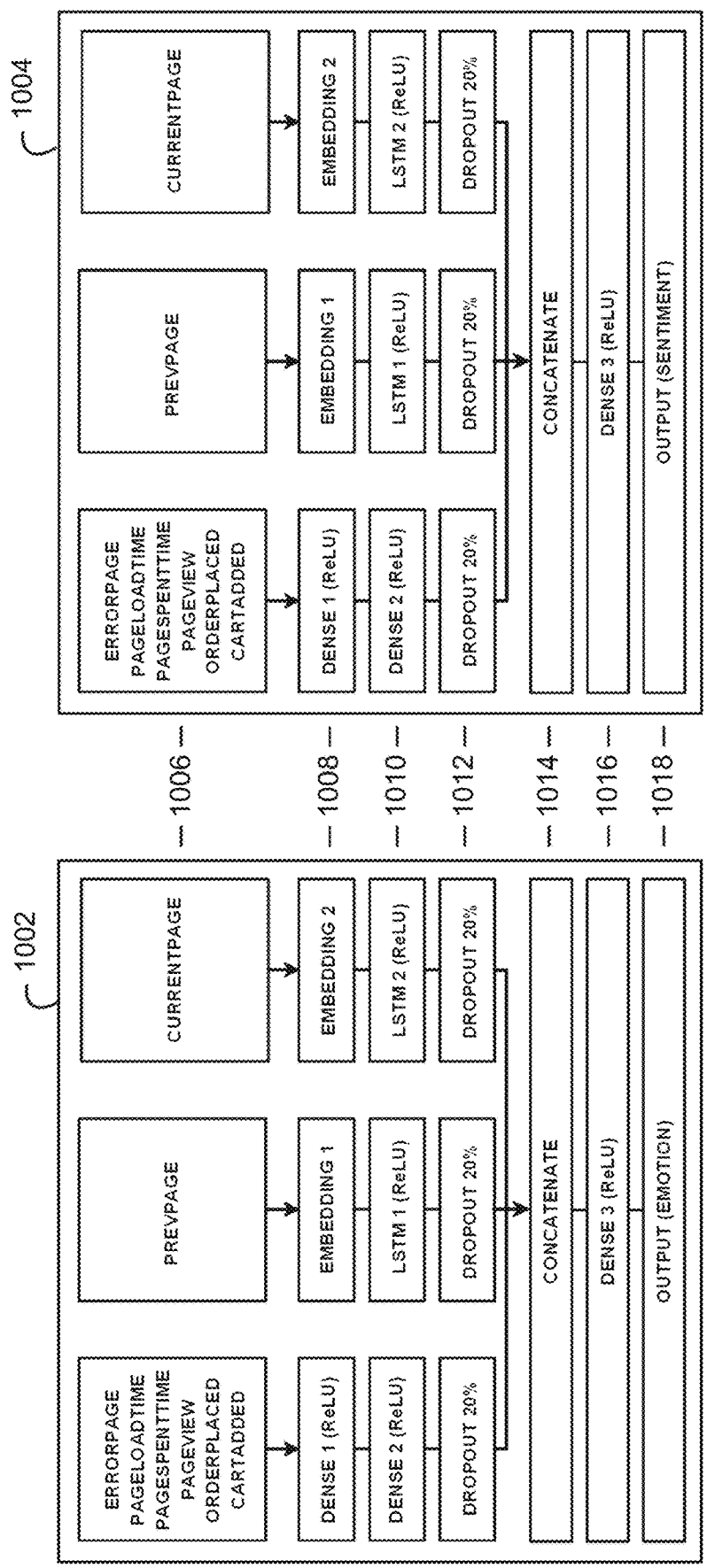
FIG. 10 provides an exemplary illustration of a model architecture used in accordance with one or more embodiments of the present disclosure.

FIG. 10 provides an exemplary illustration of a model architecture used in accordance with one or more embodiments of the present disclosure. In the example shown in FIG. 10, model 1002 can be a model making an emotion prediction and model 1004 can be a model making a sentiment prediction. As discussed herein, any number of models can be used with one or more embodiments. As shown in the example of FIG. 10, models 1002 and 1004 can have a common internal architecture.

As shown in the example shown in FIG. 10, a user reaction prediction model (e.g., models 1002 and 1004) can include multiple layers, an input layer 1006, middle layers 1008, 1010, 1012, 1014 and 1016, and an output layer 1018. In accordance with one or more embodiments, input layer 1006 receives model input (e.g., a feature dataset such as shown in row 602 determined using data from activities A1-A5) and output layer 1018 provides the model output (e.g., one or more user reaction predictions, each indicating a probability of a reaction of a user in connection with an application).

In the example shown in FIG. 10, the model input from input layer 1006 can be separated into groups of data, where PrevPage data can form a group, CurrentPage data can form a second group and the remainder of the model input (e.g., ErrorPage, PageLoadTime, PageSpentTime, PageView, OrderPlaced, and CartAdded) can form a third group. As shown in the example, each group can be processed using middle layers, including layers 1008, 1010 and 1012, to identify one or more patterns. By way of a non-limiting example, layer 1012 can provide pattern output A, B and C (corresponding to the three groups of data) to layer 1014, which can concatenate pattern output A, B and C for input to layer 1016. Layer 1016 can identify a pattern across the pattern output A, B and C. By way of a non-limiting example, layer 1016 can be used to correlate an aggregate pattern that is based on pattern output A, B and C with a user reaction (e.g., a certain emotion or sentiment). Output layer 1018 can provide output indicating a probability indicating a likelihood that the user is experiencing a certain user reaction in connection with an application.

In accordance with one or more embodiments, models 1002 and 1004 can include "Dense" model components (e.g., Dense 1 (ReLU) and Dense 2 (ReLU) components), each of which can operate to correlate data input and identify relational patterns using model input. Layer 1012 can be a DropOut layer that can be used in deep learning to reduce overfitting and address generalization error by randomly dropping out nodes (e.g., identified in a model training phase). The example shown in FIG. 10 provides one example of a dropout percentage (e.g., 20%), which can indicate a percentage of nodes dropped. It should be apparent that another dropout percentage can be used in accordance with one or more embodiments of the present disclosure.

In accordance with one or more embodiments, models 1002 and 1004 can include Long Short Term Memory ("LSTM") neural network model components (e.g., LSTM 1 (ReLU) and LSTM 2 (ReLU)) in layer 1010, which can be used to remember sequences of pages and/or events, as part of pattern recognition. Models 1002 and 1004 can further include embedding components in layer 1008, which can be used in converting input to an internal representation.

In accordance with one or more embodiments, model components can use an activation function with neural network nodes. An activation function of a node can be used in determining the output of the node. In some embodiments, model components can use a rectified linear unit ("ReLU") as an activation function. By way of a non-limiting example, an ReLU can be represented as y=max(0, x) where y represents an output corresponding to input, x. In other words, a value greater than or equal to zero can be output without modification and a negative value can be output as zero using ReLU as an activation function.

Figure 11:
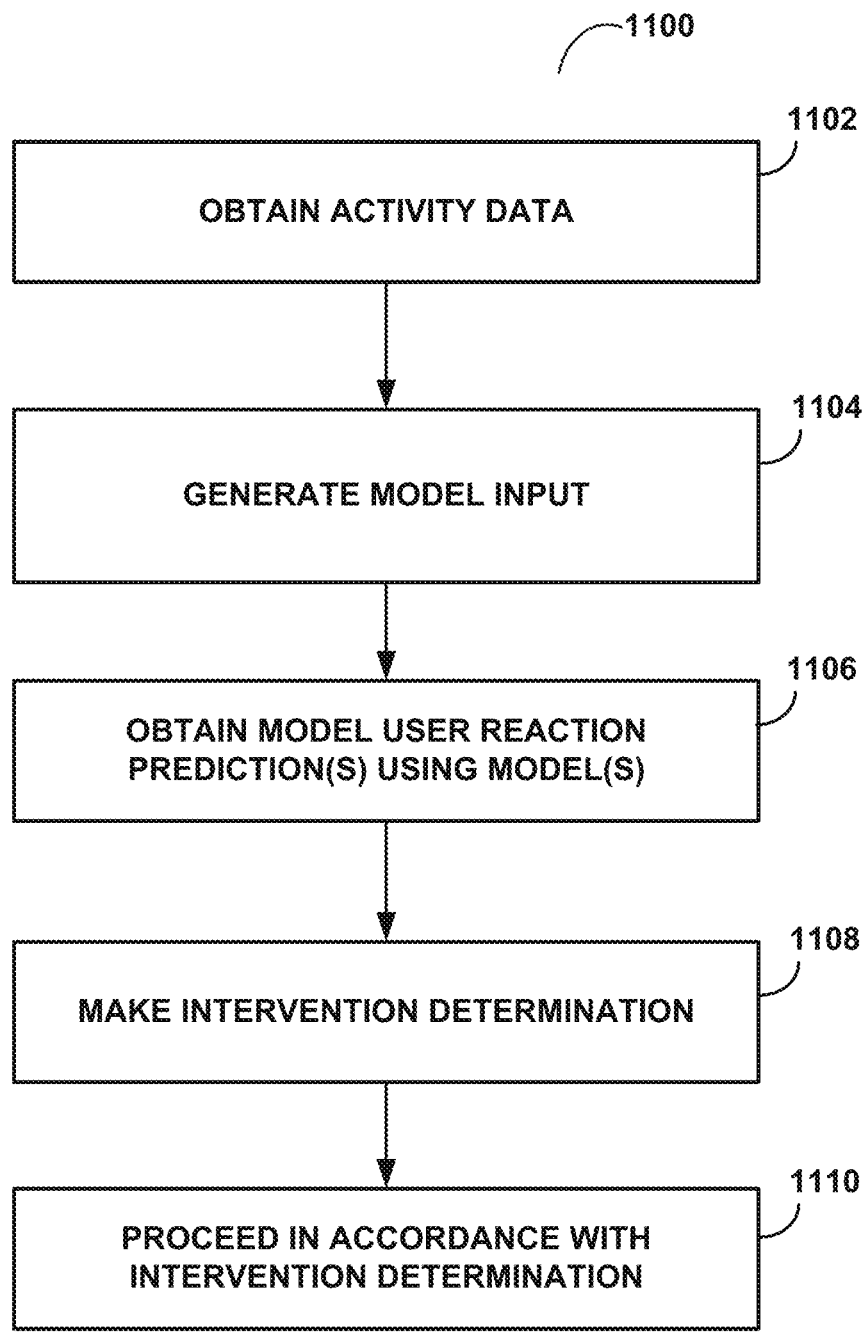
FIGS. 11-13 each provide an example of a flowchart illustrating steps performed in accordance with some embodiments of the present disclosure.

FIG. 11 provides an exemplary illustration of a process flow in accordance with one or more embodiments of the present disclosure. Briefly, steps included in process flow 1100 can be performed in connection with user interaction with an online or offline channel (e.g., an online or offline application, chatbot, mobile application, etc.). In the process flow examples shown in FIGS. 11-13, a web application is used as an example of an online channel being accessed by the user. It should be apparent that any channel (online or offline) can be used in connection with the embodiments disclosed herein. In accordance with one or more embodiments, process flow 1100 can operate to identify a likelihood of a user reaction, use the identified likelihood to make a determination whether or not to intervene with one or more remedial actions to address a user reaction that might otherwise negatively impact one or more intended results.

At step 1102, activity data can be obtained in connection with each activity involving a user's interaction with the web application (or other channel) being accessed by the user. Examples of activities in connection with which data can be obtained and retained include page load and link selection activities. As discussed herein (e.g., in connection with FIGS. 5-7 and 10) and in accordance with one or more embodiments, activity data can include page sequence, user behavior, application behavior, intended result, and derived attribute data.

At step 1104, model input (e.g., feature dataset(s)) can be generated in connection with one or more activities. By way of a non-limiting example, model input can comprise a set of features generated using data collected in connection with at least one activity. In accordance with one or more embodiments, each feature dataset can comprise derived data attributes such as illustrated in row 602 of FIG. 6.

In accordance with one or more embodiments, activity data associated with a current session of a user with the application can be used to generate the feature set, such that activity data associated with a current activity data can be combined with activity data collected in connection with previous activities (if any) occurring in the current session.

With reference to FIG. 6, activities A1-A5 can represent activities in a current session, with activity A1 being a first activity in the session. In response to activity A1, activity data associated with activity A1 can be collected and used to generate a feature set, e.g., using the guidelines shown in FIG. 7. As discussed, the feature dataset can comprise attribute data derived attributes (exemplified in row 602 of FIG. 6) using activity data associated with activity A1.

In response to the occurrence of activity A2, activity data associated with activity A1 can be combined with activity data collected in connection with activity A2 to generate a feature set comprising derived attribute data for input to one or more user reaction prediction models. Model input can be generated in this manner in response to the occurrence of each subsequent activity. In the example shown in FIG. 6, the row 602 provides a feature set example generated in connection with the occurrence of activity A5, where the feature set example can be generated using activity data obtained in connection with activities A1-A5.

Referring again to FIG. 11, one or more user reaction predictions can be obtained using one or more models. In accordance with one or more embodiments, the user reaction prediction(s) can be obtained using the model input generated at step 1106 and at least one trained user reaction prediction model (e.g., models 1002 and 1004 of FIG. 10). In accordance with one or more embodiments, output of each model can comprise a probability representing a likelihood of a user reaction (e.g., a likelihood that the user is experiencing the user reaction). As discussed herein, examples of types of user reaction being gauged in connection with one or more embodiments can include sentiment (e.g., positive or negative) and emotion (e.g., hesitant, focused or frustrated).

At step 1108, an intervention determination can be made. In accordance with one or more embodiments, a determination is made whether or not to intervene with one or more remedial actions. In accordance with one or more embodiments, a probability threshold can be used with a user reaction prediction output from a user reaction prediction model to determine whether or not to take action and what action to take. By way of a non-limiting example, a comparison of the probability output by each model and a corresponding probability threshold can be made to determine whether the probability output satisfies (e.g., exceeds, is greater than or equal to, etc.) the corresponding probability threshold. If so, a determination can be made to take at least one remedial action. As discussed in more detail in connection with FIG. 13, each user reaction can have one or more associated remedial action(s) to be taken, and different remedial actions may be associated with different probabilities, such that a more significant intervention can be taken as the probability increases, for example.

At step 1110, process 1100 proceeds in accordance with the intervention determination made at step 1108. By way of a non-limiting example, user reaction prediction model output can indicate that no action is warranted at this time. In such a case, no intervention is undertaken (e.g., by the web application, or other online or offline channel). On the other hand and in the case that there is at least one indication of a need for remedial action, then such action(s) can be taken at step 1110 (e.g., by the web application, or other online or offline channel).

Figure 12:
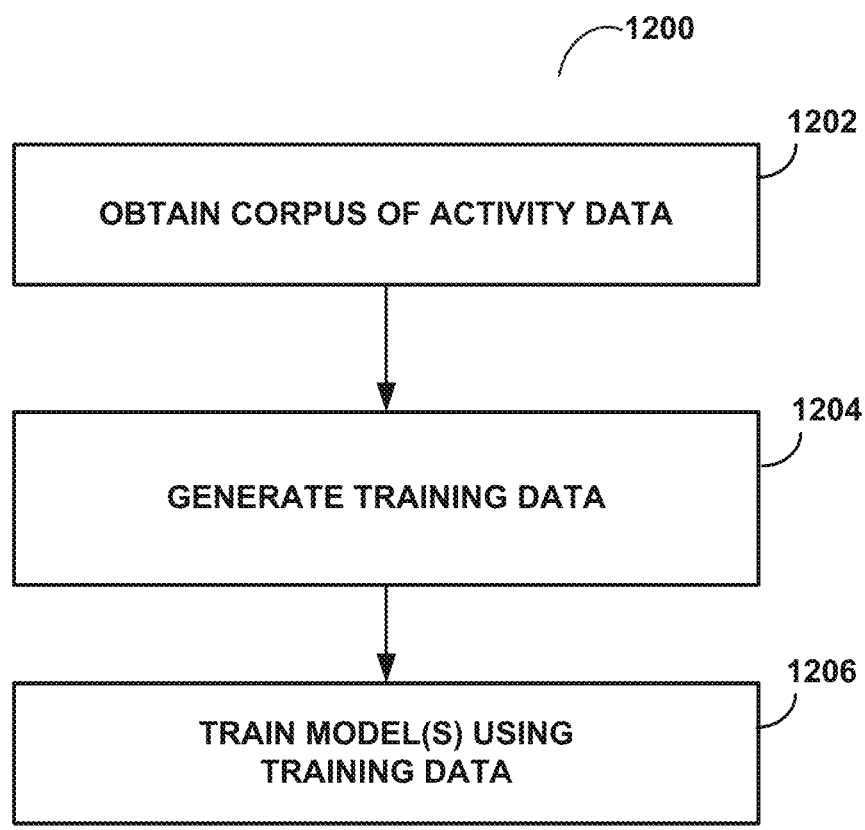

As discussed herein in connection with one or more embodiments, one or more user reaction prediction models can be trained to predict user reaction. FIG. 12 provides an example of a model training process flow used in accordance with one or more embodiments of the present disclosure. In general, steps included in process flow 1200 can be performed using activity data obtained in connection with a number of sessions and users accessing one or more channels (online and/or offline channels) provided by one or more providers. In accordance with one or more embodiments, process flow 1200 can operate to use the activity data to generate a number of training examples (e.g., a number of feature sets, such as the feature set example shown in row 602 of FIG. 6) that can be used to train each user reaction prediction model using one or more machine learning algorithms.

At step 1202, a corpus of activity data can be obtained. In accordance with one or more embodiments, the corpus of activity data can be associated with multiple user sessions. By way of a non-limiting example, activity data obtained at step 1102 in connection with multiple sessions and multiple users of one or more channels can be stored (or logged) and used as the corpus of activity data. By way of another non-limiting example, open source clickstream data can be used as a corpus of activity data. By way of another non-limiting example, some combination of open source data and the data obtained at step 1102 can be used, such as and without limitation open source data can be used to initially train a model and activity data obtained at step 1102 can be used to update (e.g., retrain) the model.

In accordance with one or more embodiments, the training data can be a corpus of training examples, each of which can be a feature set generated in a manner discussed herein, including the discussion in connection with step 1104 of FIG. 11. By way of a non-limiting example, the corpus can comprise a number of feature datasets, each feature dataset comprising derived data attributes exemplified in row 602 of FIG. 6.

At step 1204, training data is generated. In accordance with one or more embodiments, the training data comprising a number of feature datasets can be generated using some or all of the activity data obtained at step 1202.

At step 1206, one or more models are trained using the training data. By way of a non-limiting example, training data comprising a number of feature datasets generated (at step 1204) using some or all of the corpus of activity data (obtained at step 1202) can be used to train the model(s). In accordance with one or more embodiments, the training data can comprise multiple training examples (e.g., multiple feature datasets) that can be used to train each user reaction prediction model to make a user reaction prediction in response to feature dataset input generated using current activity data. As discussed, each model can be trained to output a probability in connection with a user reaction. In accordance with one or more embodiments, step 1206 can be used with one or more machine learning algorithms and training data generated (at step 1204) using data obtained (at step 1202) to train models 1002 and 1004.

Figure 13:
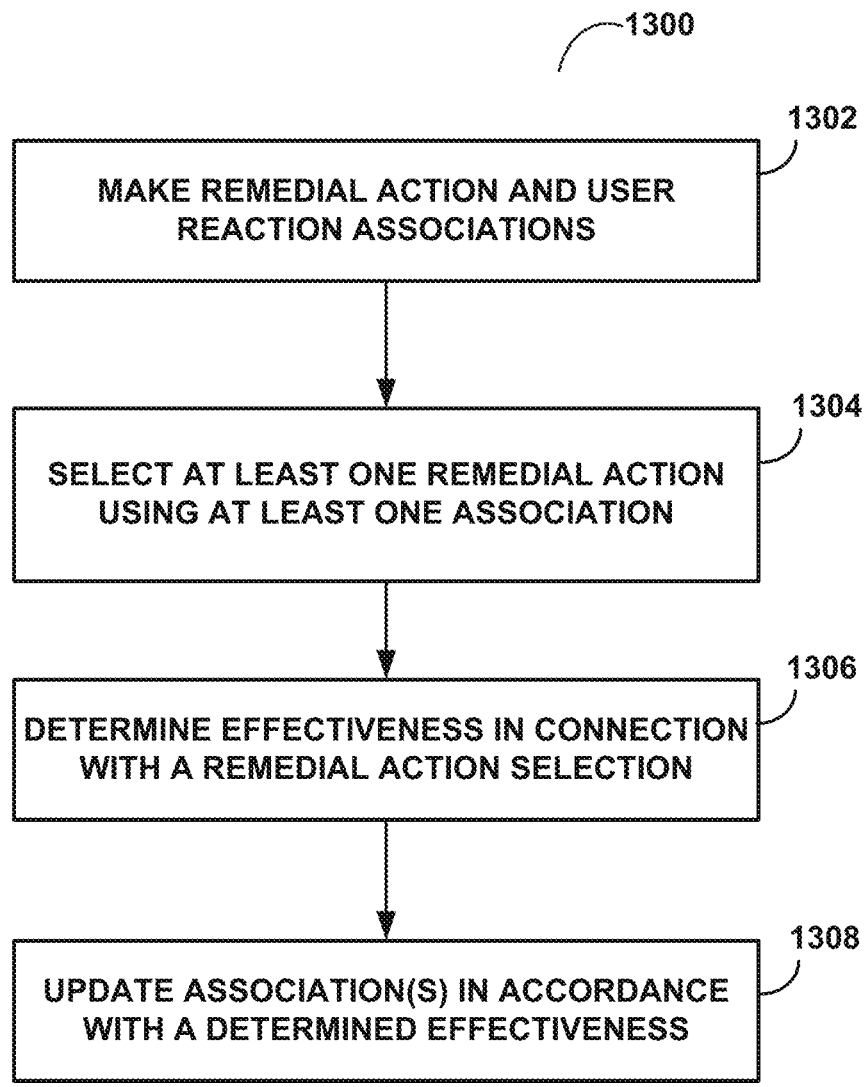

As discussed in connection with step 1110 of FIG. 11, one or more remedial actions can be identified in connection with a user reaction prediction and a determination to intervene (at step 1108). FIG. 13 provides a remedial action identification process flow in accordance with one or more embodiments of the present disclosure. Briefly, steps included in process flow 1300 can be used in identifying at least one remedial action to take in response to a determination to intervene (e.g., such as the determination that can be made at step 1108 of FIG. 11).

At step 1302, remedial action and user reaction associations can be made. In accordance with one or more embodiments, a data store can be used to associate each user reaction being monitored with at least one remedial action. By way of a non-limiting example, one or more database (relational database) tables can be used to associate a user reaction with one or more remedial actions. In accordance with one or more embodiments, one or more remedial actions can be associated with a user reaction and a probability (or range of probabilities), such that one or more remedial actions can be identified (or selected) based on the user reaction and a determined user action prediction indicating a likelihood of the user reaction.

In accordance with one or more embodiments, an association can be initially created and subsequently modified. By way of a non-limiting example, a remedial action initially associated with a user reaction (or a user reaction and probability) might be determined to be inadequate and be replaced with one or more other remedial actions as a result. As is discussed in more detail below, activity data can be obtained in connection with a remedial action and used to make a determination whether or not a user reaction improved as a result of the remedial action(s) taken. In other words, a remedial action's efficacy, or effectiveness, can be evaluated using user reaction prediction model output.

At step 1304, at least one remedial action can be selected using at least one association. To further illustrate, the remedial action(s) selected at step 1304 can be selected using at least one of the remedial action-user reaction associations created at step 1302. By way of a non-limiting example, a user reaction can be used to search one or more database tables to retrieve one or more remedial actions associated with the user reaction. In the case where model probability output is used, the user reaction and probability can be used in a search to retrieve one or more remedial actions.

In accordance with one or more embodiments, steps 1306 and 1308 can be performed to update associations made at step 1302. At step 1306, an effectiveness can be determined in connection with a remedial action selection. At step 1308, the association(s) can be updated in accordance with a determined effectiveness.

In accordance with one or more embodiments, a determination can be made (at step 1306) as to the effectiveness of a remedial action used in response to a user reaction. As discussed herein, a remedial action can be provided in a display (e.g., a dialog or other display) at the user's computing device, and in some cases can include a user-selectable link.

In accordance with one or more embodiments, activity data can be obtained in connection with the loading of the display and/or user selection of a link included in the remedial action display. As with any activity data obtained, the activity data obtained in connection with the remedial action can be used (e.g., along with activity data obtained from previous activities) to generate a feature dataset for input to one or more user reaction prediction models to obtain one or more user reaction predictions. A user reaction prediction generated after the remedial action is used can be compared with a user reaction prediction made prior to the remedial action being taken. The comparison can be used to ascertain whether or not (and to what extent) the remedial action resulted in an improvement in a detected user reaction. By way of a non-limiting example, an improvement can be indicated by a reduction in the probability in the case of a hesitant or frustrated emotion or a negative sentiment or an increase in the probability in the case of a focused emotion or a positive sentiment.

By way of a non-limiting example and with reference to FIG. 9, activity A5 can correspond to the remedial action (e.g., chat popup and/or smart similarity presentation) taken in connection with a determination (in row no. 4) that there is an 83% probability that the user is hesitant. The determination made in response to activity A5 indicating a 91% probability that the user is hesitant can be indicative of the case that the user reaction to the remedial action was unimproved. As a result, the remedial action might be replaced with another one or more remedial actions (e.g. at step 1308 of FIG. 13).

In accordance with one or more embodiments, user reaction can be monitored and measured using one or more trained user reaction prediction models and activity data, such as behavioral data (e.g., online user browsing behavior, online application behavior, etc.), view, display, page, etc. sequences, intended result data and a number of attributes derivable from the data. Unlike an interpersonal interaction (e.g., a user's visit to a brick and mortar establishment), in the case of a user's experience with an online or offline channel (e.g., an application, such as and without limitation a web application, a mobile application, a chatbot, or the like), there is little, if any, ability to assess a user's reaction, or current state. Advantageously, embodiments of the present disclosure can be used to assess a user's reaction, and intervene to address an unwanted reaction before the user loses interest and/or discontinues the experience.

Figure 14:
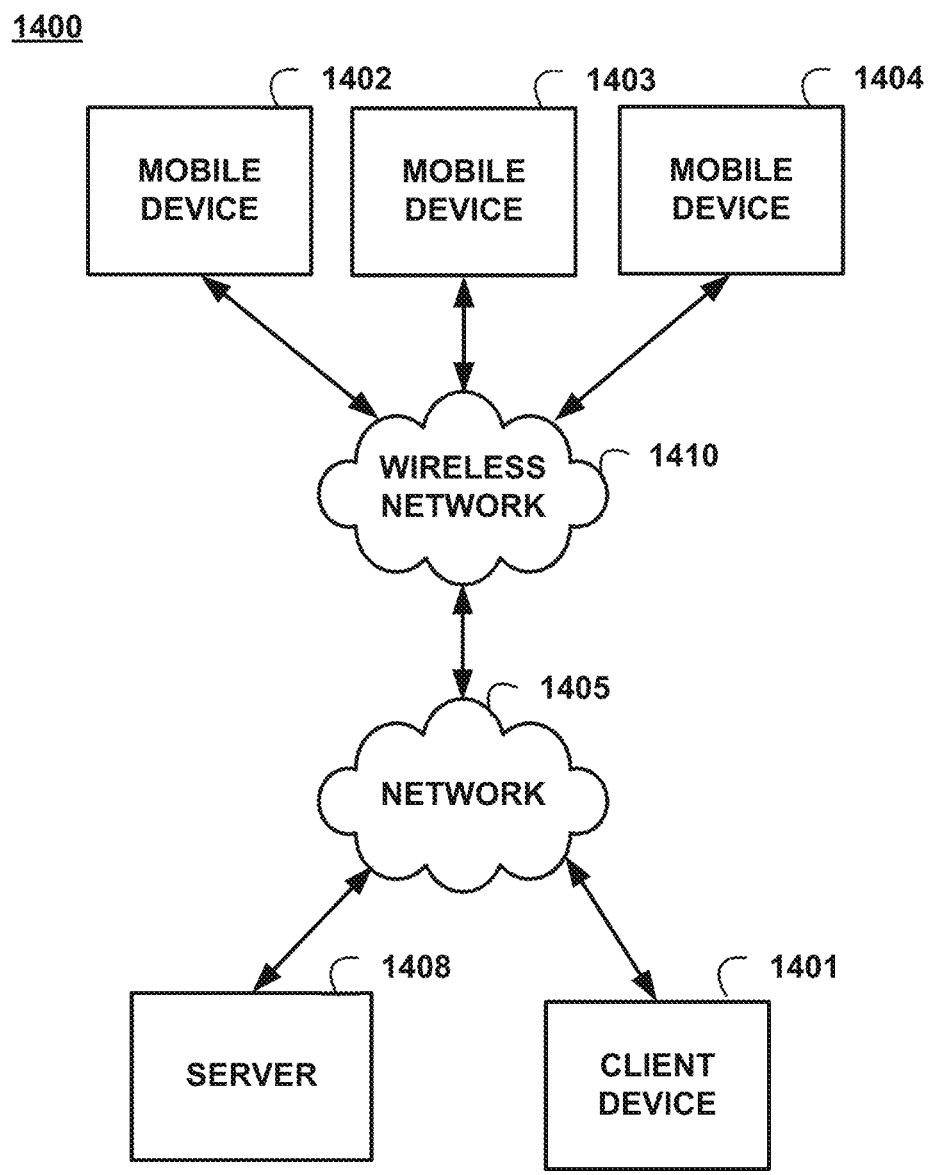
FIG. 14 is a schematic diagram illustrating an example of a network within which the systems and methods disclosed herein could be implemented according to some embodiments of the present disclosure.

FIG. 14 provides an example of components of a general environment in accordance with one or more embodiments. FIG. 14 shows components of a general environment in which the systems and methods discussed herein may be practiced. Not all the components may be required to practice the disclosure, and variations in the arrangement and type of the components may be made without departing from the spirit or scope of the disclosure. As shown, system 1400 of FIG. 14 includes local area networks ("LANs")/wide area networks ("WANs")—network 1405, wireless network 1410, mobile devices (client devices) 1402-1404 and client device 1401. FIG. 14 additionally includes a server 1408. Examples of web servers include without limitation, application servers, content servers, search servers, advertising servers, etc.

In accordance with one or more embodiments, server 1408 can include functionality disclosed herein in connection with one or more embodiments. Server 1408 can host one or more web applications, for which user reaction is being monitored.

One embodiment of mobile devices 1402-1404 is described in more detail below. Generally, however, mobile devices 1402-1404 may include virtually any portable computing device capable of receiving and sending a message over a network, such as network 1405, wireless network 1410, or the like. Mobile devices 1402-1404 may also be described generally as client devices that are configured to be portable. Thus, mobile devices 1402-1404 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 1402-1404 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 1402-1404 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 1402-1404 may uniquely identify themselves through any of a variety of mechanisms, including a phone number, Mobile Identification Number (MIN), an electronic serial number (ESN), or other mobile device identifier.

In some embodiments, mobile devices 1402-1404 may also communicate with non-mobile client devices, such as client device 1401, or the like. Client device 1401 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 1401 may also have differing capabilities for displaying navigable views of information.

Client device 1401 and mobile devices 1401-1404 may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 1410 is configured to couple mobile devices 1402-1404 and its components with network 1405. Wireless network 1410 may include any of a variety of wireless sub-networks that may further overlay stand-alone ad-hoc networks, and the like, to provide an infrastructure-oriented connection for mobile devices 1402-1404. Such sub-networks may include mesh networks, Wireless LAN (WLAN) networks, cellular networks, and the like.

Network 1405 is configured to communicatively couple web server 1408 with other computing devices, including, client device 1401, and through wireless network 1410 to mobile devices 1402-1404. Network 1405 is enabled to employ any form of computer readable media for communicating information from one electronic device to another. Also, network 1405 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

A server, such as server 1408, may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers, such as web server 1408 as well as other servers, such as and without limitation authentication servers, search servers, email servers, social networking services servers, SMS servers, IM servers, MMS servers, exchange servers, photo-sharing services servers, and travel services servers, via the network 1405 using their various devices 1401-1404. In some embodiments, application server can host applications, such as an e-commerce application, a search engine, a content recommendation and/or distribution application, etc.

In some embodiments, web server 1408 can store various types of applications and application related information including application data. As is discussed in more detail below, examples of application data include user behavior, application behavior, page visitation sequences, and visit intent and action data. In accordance with some embodiments, web server 1408 can host an application, or applications, embodying functionality described herein.

Moreover, although FIG. 14 illustrates web server 1408 as single computing devices, respectively, the disclosure is not so limited. For example, one or more functions of web server 1408 may be distributed across one or more distinct computing devices. Moreover, in one embodiment, web server 1408 may be integrated into a single computing device, without departing from the scope of the present disclosure.

Figure 15:
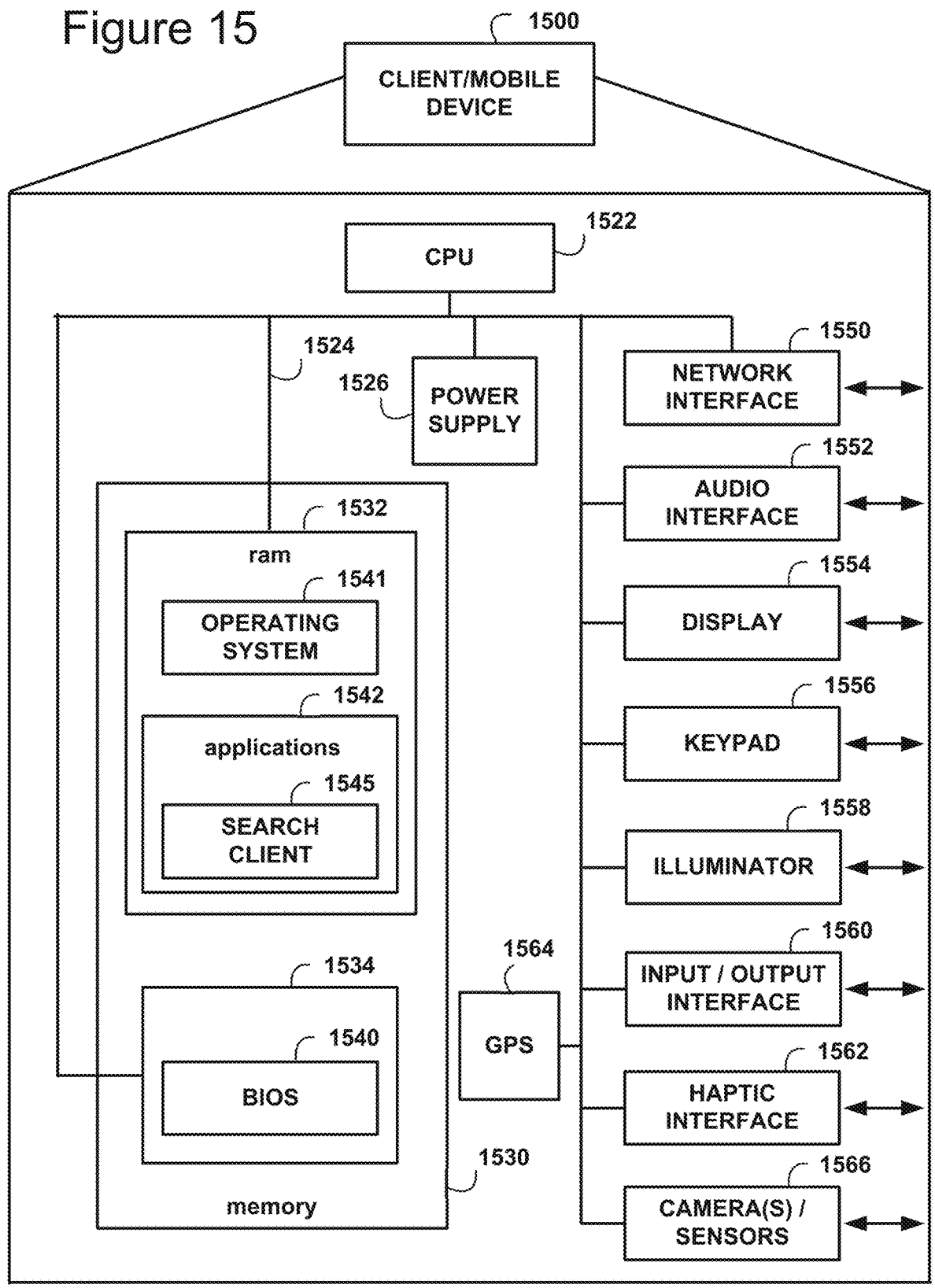
FIG. 15 depicts is a schematic diagram illustrating an example of client device in accordance with some embodiments of the present disclosure.

FIG. 15 is a schematic diagram illustrating an example embodiment of a computing device that may be used within the present disclosure. Device 1500 may include many more or less components than those shown in FIG. 15. However, the components shown are sufficient to disclose an illustrative embodiment for implementing the present disclosure. Device 1500 may represent, for example, client device 1401 and mobile devices 1401-1404 discussed above in relation to FIG. 14.

As shown in the figure, device 1500 includes a processing unit (CPU) 1522 in communication with a mass memory 1530 via a bus 1524. Device 1500 also includes a power supply 1526, one or more network interfaces 1550, an audio interface 1552, a display 1554, a keypad 1556, an illuminator 1558, an input/output interface 1560, a haptic interface 1562, an optional global positioning systems (GPS) receiver 1564 and a camera(s) or other optical, thermal or electromagnetic sensors 1566. Device 1500 can include one camera/sensor 1566, or a plurality of cameras/sensors 1566, as understood by those of skill in the art. The positioning of the camera(s)/sensor(s) 1566 on device 1500 can change per device 1500 model, per device 1500 capabilities, and the like, or some combination thereof Power supply 1526 provides power to device 1500. A rechargeable or non-rechargeable battery may be used to provide power. The power may also be provided by an external power source, such as an AC adapter or a powered docking cradle that supplements and/or recharges a battery.

Device 1500 may optionally communicate with a base station (not shown), or directly with another computing device. Network interface 1550 includes circuitry for coupling device 1500 to one or more networks, and is constructed for use with one or more communication protocols and technologies as discussed above. Network interface 1550 is sometimes known as a transceiver, transceiving device, or network interface card (NIC).

Audio interface 1552 is arranged to produce and receive audio signals such as the sound of a human voice. For example, audio interface 1552 may be coupled to a speaker and microphone (not shown) to enable telecommunication with others and/or generate an audio acknowledgement for some action. Display 1554 may be a liquid crystal display (LCD), gas plasma, light emitting diode (LED), or any other type of display used with a computing device. Display 1554 may also include a touch sensitive screen arranged to receive input from an object such as a stylus or a digit from a human hand.

Keypad 1556 may comprise any input device arranged to receive input from a user. For example, keypad 1556 may include a push button numeric dial, or a keyboard. Keypad 1556 may also include command buttons that are associated with selecting and sending images. Illuminator 1558 may provide a status indication and/or provide light. Illuminator 1558 may remain active for specific periods of time or in response to events. For example, when illuminator 1558 is active, it may backlight the buttons on keypad 1556 and stay on while the client device is powered. Also, illuminator 1558 may backlight these buttons in various patterns when particular actions are performed, such as dialing another client device. Illuminator 1558 may also cause light sources positioned within a transparent or translucent case of the client device to illuminate in response to actions.

Device 1500 also comprises input/output interface 1560 for communicating with external devices, such as a headset, or other input or output devices not shown in FIG. 15. Input/output interface 1560 can utilize one or more communication technologies, such as USB, infrared, Bluetooth™, or the like. Haptic interface 1562 is arranged to provide tactile feedback to a user of the client device. For example, the haptic interface may be employed to vibrate device 1500 in a particular way when the device 1500 receives a communication from another user.

Optional GPS transceiver 1564 can determine the physical coordinates of device 1500 on the surface of the Earth, which typically outputs a location as latitude and longitude values. GPS transceiver 1564 can also employ other geo-positioning mechanisms, including, but not limited to, triangulation, assisted GPS (AGPS), E-OTD, CI, SAI, ETA, BSS or the like, to further determine the physical location of device 1500 on the surface of the Earth. It is understood that under different conditions, GPS transceiver 1564 can determine a physical location within millimeters for device 1500; and in other cases, the determined physical location may be less precise, such as within a meter or significantly greater distances. In one embodiment, however, device 1500 may through other components, provide other information that may be employed to determine a physical location of the device, including for example, a MAC address, Internet Protocol (IP) address, or the like.

Mass memory 1530 includes a RAM 1532, a ROM 1534, and other storage means. Mass memory 1530 illustrates another example of computer storage media for storage of information such as computer readable instructions, data structures, program modules or other data. Mass memory 1530 stores a basic input/output system ("BIOS") 1540 for controlling low-level operation of device 1500. The mass memory also stores an operating system 1541 for controlling the operation of device 1500. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 1530 further includes one or more data stores, which can be utilized by device 1500 to store, among other things, applications 1542 and/or other data. For example, data stores may be employed to store information that describes various capabilities of device 1500. The information may then be provided to another device based on any of a variety of events, including being sent as part of a header during a communication, sent upon request, or the like. At least a portion of the capability information may also be stored on a disk drive or other storage medium (not shown) within device 1500.

Applications 1542 may include computer executable instructions which, when executed by device 1500, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 1542 may further include search client 1545 that is configured to send, to receive, and/or to otherwise process a search query and/or search result using any known or to be known communication protocols. Although a single search client 1545 is illustrated it should be clear that multiple search clients may be employed. For example, one search client may be configured to enter a search query message, where another search client manages search results, and yet another search client is configured to manage serving advertisements, IMs, emails, and other types of known messages, or the like.

Figure 16:
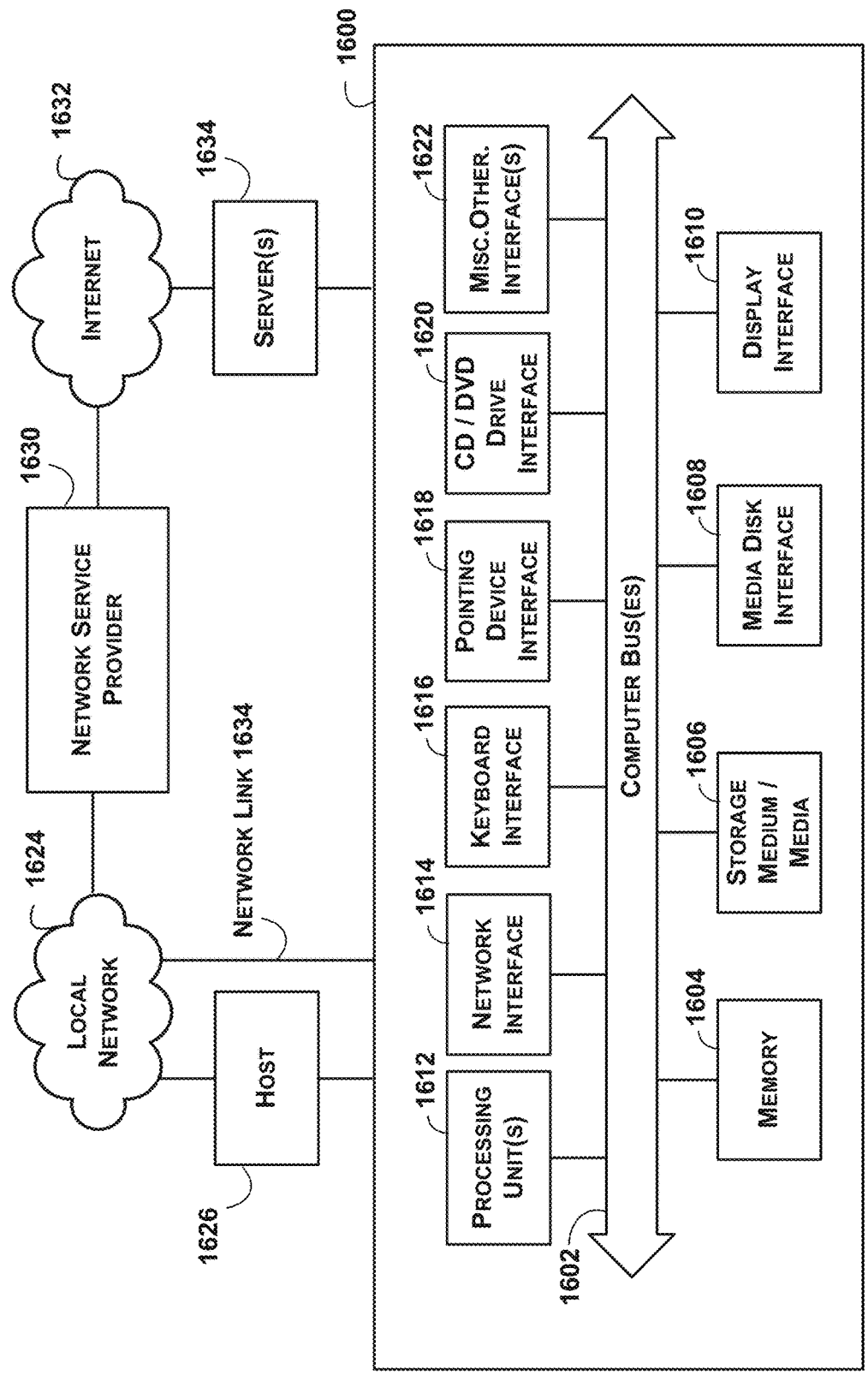
FIG. 16 is a block diagram illustrating the architecture of an exemplary hardware device in accordance with one or more embodiments of the present disclosure.

As shown in FIG. 16, internal architecture 1600 of a computing device(s), computing system, computing platform, user devices, set-top box, smart TV and the like includes one or more processing units, processors, or processing cores, (also referred to herein as CPUs) 1612, which interface with at least one computer bus 1602. Also interfacing with computer bus 1602 are computer-readable medium, or media, 1606, media disk interface 1608, network interface 1614, memory 1604, e.g., random access memory (RAM), run-time transient memory, read only memory (ROM), media disk drive interface 1620 as an interface for a drive that can read and/or write to media including removable media such as floppy, CD-ROM, DVD, media, display interface 1610 as interface for a monitor or other display device, keyboard interface 1616 as interface for a keyboard, pointing device interface 1618 as an interface for a mouse or other pointing device, and miscellaneous other interfaces 1622 not shown individually, such as parallel and serial port interfaces and a universal serial bus (USB) interface.

Memory 1604 interfaces with computer bus 1602 so as to provide information stored in memory 1604 to CPU 1612 during execution of software programs such as an operating system, application programs, device drivers, and software modules that comprise program code, and/or computer executable process steps, incorporating functionality described herein, e.g., one or more of process flows described herein. CPU 1612 first loads computer executable process steps from storage, e.g., memory 1604, computer readable storage medium/media 1606, removable media drive, and/or other storage device. CPU 1612 can then execute the stored process steps in order to execute the loaded computer-executable process steps. Stored data, e.g., data stored by a storage device, can be accessed by CPU 1612 during the execution of computer-executable process steps.

Persistent storage, e.g., medium/media 1606, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 1634 typically provides information communication using transmission media through one or more networks to other devices that use or process the information. For example, network link 1634 may provide a connection through local network 1624 to a host computer 1626 or to equipment operated by a Network or Internet Service Provider (ISP) 1630. ISP equipment in turn provides data communication services through the public, worldwide packet-switching communication network of networks now commonly referred to as the Internet 1632.

A computer called a server host 1634 connected to the Internet 1632 hosts a process that provides a service in response to information received over the Internet 1632. For example, server host 1634 hosts a process that provides information representing video data for presentation at a display via display interface 1610. It is contemplated that the components of system 1600 can be deployed in various configurations within other computer systems, e.g., host and server.

At least some embodiments of the present disclosure are related to the use of computer system 1600 for implementing some or all of the techniques described herein. According to one embodiment, those techniques are performed by computer system 1600 in response to processing unit 1612 executing one or more sequences of one or more processor instructions contained in memory 1604. Such instructions, also called computer instructions, software and program code, may be read into memory 1604 from another computer-readable medium 1606 such as storage device or network link. Execution of the sequences of instructions contained in memory 1604 causes processing unit 1612 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 1600. Computer system 1600 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 1612 as it is received, or may be stored in memory 1604 or in storage device or other non-volatile storage for later execution, or both.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, the subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment, and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms such as "and," "or," or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer-readable medium (or computer-readable storage medium/media) stores computer data, which data can include computer program code (or computer-executable instructions) that is executable by a computer, in machine-readable form. By way of example, and not limitation, a computer-readable medium may comprise computer-readable storage media, for tangible or fixed storage of data, or communication media for transient interpretation of code-containing signals. Computer-readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer-readable storage media can tangibly encode computer-executable instructions that when executed by a processor associated with a computing device perform functionality disclosed herein in connection with one or more embodiments.

Computer-readable storage media includes, but is not limited to, RAM, ROM, EPROM, EEPROM, flash memory or other solid-state memory technology, CD-ROM, DVD, or other optical storage, cloud storage, magnetic cassettes, magnetic tape, magnetic disk storage or other magnetic storage devices, or any other physical or material medium which can be used to tangibly store thereon the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

The invention claimed is:

1. A method comprising:
   obtaining, by a computing device executing an application, activity data in connection with a user of the application, the activity data being based on a page load within the application and further based on a link selection via the application, such that the activity data spans a time from the page load to the link selection;
   generating, by the computing device, for the page load activity and the link selection activity, model inputs comprising a feature dataset using the obtained activity data;
   analyzing, by the computing device, the activity data via a user reaction prediction model executed by the computing device, the analysis comprising inputting both of the generated model inputs to the user reaction prediction model, the user reaction prediction model trained using historical user activity data via a machine learning algorithm;
   determining, by the computing device, based on the analysis of the activity data via the execution of the user reaction prediction model, a user reaction prediction associated with a user reaction, the user reaction prediction indicating a probability of an emotion type and sentiment type of the user reaction, the emotion type of the user reaction being in view of a temporal probability threshold specific to the user, the sentiment type of the user reaction being in view of a type of sentiment exhibited by the user reaction;
   determining, by the computing device, based on the determined user reaction prediction, a remedial action, the remedial action comprising a type of executable instruction for the computing device to execute for displaying supplemental information related to the application;
   causing, by the computing device, performance of the remedial action upon detection of the user reaction, the performance comprising an automatic display of the supplemental information;
   monitoring, by the computing device, the performance of the remedial action and automatically obtaining additional activity data related to the performance of the remedial action;
   determining, by the computing device, an efficacy of the remedial action based on the additional activity data related to the performance of the remedial action, the efficacy determination being based on analysis of the additional activity data by the user reaction prediction model;
   determining, by the computing device, another user reaction prediction from the user reaction prediction model based on the determined efficacy of the remedial action; and causing, by the computing device, performance of a subsequent remedial action based on the other user reaction prediction.

2. The method of claim 1, further comprising:
determining, by the computing device, that the probability of the user reaction indicated by the user reaction prediction satisfies a threshold probability associated with the user reaction;
identifying, by the computing device, the remedial action in response to the determination that the probability of the user reaction indicated by the user reaction prediction satisfies a threshold probability associated with the user reaction.

3. The method of claim 1, wherein the user reaction prediction model is trained to output the user reaction prediction indicating a probability of the user reaction being a positive or negative user sentiment.

4. The method of claim 3, wherein the user reaction prediction model uses feature dataset data comprising page load time and error page data in determining the user reaction prediction indicating a probability of the user reaction being a positive or negative user sentiment.

5. The method of claim 1, wherein the user reaction prediction model is trained to output the user reaction prediction indicating a probability of the user emotion.

6. The method of claim 5, wherein the user emotion is one of frustration, hesitance, or focus.

7. The method of claim 6, wherein the user reaction prediction model uses feature dataset data comprising error page and page load time data in determining the user reaction prediction indicating a probability of frustration.

8. The method of claim 6, wherein the user reaction prediction model uses feature dataset data comprising intended result, page spent time, and page view data in determining the user reaction prediction indicating a probability of hesitance.

9. The method of claim 6, wherein the user reaction prediction model uses feature dataset data comprising page spent time and page view data in determining the user reaction prediction indicating a probability of focus.

10. A non-transitory computer-readable storage medium tangibly encoded with computer-executable instructions, that when executed by a processor associated with a computing device, perform a method comprising:
obtaining activity data in connection with a user of an application, the activity data being based on a page load within the application and further based on a link selection via the application, such that the activity data spans a time from the page load to the link selection;
generating, for the page load activity and the link selection activity, model inputs comprising a feature dataset using the obtained activity data;
analyzing the activity data via a user reaction prediction model executed by the computing device, the analysis comprising inputting both of the generated model inputs to the user reaction prediction model, the user reaction prediction model trained using historical user activity data via a machine learning algorithm;
determining, based on the analysis of the activity data via the execution of the user reaction prediction model, a user reaction prediction associated with a user reaction, the user reaction prediction indicating a probability of an emotion type and sentiment type of the user reaction, the emotion type of the user reaction being in view of a temporal probability threshold specific to the user, the sentiment type of the user reaction being in view of a type of sentiment exhibited by the user reaction;
determining, based on the determined user reaction prediction, a remedial action, the remedial action comprising a type of executable instruction for the computing device to execute for displaying supplemental information related to the application;
causing performance of the remedial action upon detection of the user reaction, the performance comprising an automatic display of the supplemental information;
monitoring the performance of the remedial action and automatically obtaining additional activity data related to the performance of the remedial action;
determining an efficacy of the remedial action based on the additional activity data related to the performance of the remedial action, the efficacy determination being based on analysis of the additional activity data by the user reaction prediction model;
determining another user reaction prediction from the user reaction prediction model based on the determined efficacy of the remedial action; and
causing performance of a subsequent remedial action based on the other user reaction prediction.

11. The non-transitory computer-readable storage medium of claim 10, further comprising:
determining that the probability of the user reaction indicated by the user reaction prediction satisfies a threshold probability associated with the user reaction;
identifying the remedial action in response to the determination that the probability of the user reaction indicated by the user reaction prediction satisfies a threshold probability associated with the user reaction.

12. The non-transitory computer-readable storage medium of claim 10, wherein the user reaction prediction model is trained to output the user reaction prediction indicating a probability of the user reaction being a positive or negative user sentiment.

13. The non-transitory computer-readable storage medium of claim 10, wherein the user reaction prediction model is trained to output the user reaction prediction indicating a probability of the user emotion.

14. A computing device comprising:
a processor, configured to:
obtain activity data in connection with a user of an application, the activity data being based on a page load within the application and further based on a link selection via the application, such that the activity data spans a time from the page load to the link selection;
generate, for the page load activity and the link selection activity, model inputs comprising a feature dataset using the obtained activity data;
analyze the activity data via a user reaction prediction model executed by the computing device, the analysis comprising inputting both of the generated model input to the user reaction prediction model, the user reaction prediction model trained using historical user activity data via a machine learning algorithm;
determine, based on the analysis of the activity data via the execution of the user reaction prediction model, a user reaction prediction associated with a user reaction, the user reaction prediction indicating a probability of an emotion type and sentiment type of the user reaction, the emotion type of the user reaction being in view of a temporal probability threshold specific to the user, the sentiment type of the user reaction being in view of a type of sentiment exhibited by the user reaction;

determine, based on the determined user reaction prediction, a remedial action, the remedial action comprising a type of executable instruction for the computing device to execute for displaying supplemental information related to the application;

cause performance of the remedial action upon detection of the user reaction, the performance comprising an automatic display of the supplemental information;

monitor the performance of the remedial action and automatically obtaining additional activity data related to the performance of the remedial action;

determine an efficacy of the remedial action based on the additional activity data related to the performance of the remedial action, the efficacy determination being based on analysis of the additional activity data by the user reaction prediction model;

determine another user reaction prediction from the user reaction prediction model based on the determined efficacy of the remedial action; and cause performance of a subsequent remedial action based on the other user reaction prediction.

15. The computing device of claim 14, the processor further configured to:
   determine that the probability of the user reaction indicated by the user reaction prediction satisfies a threshold probability associated with the user reaction; and
   identify the remedial action in response to the determination that the probability of the user reaction indicated by the user reaction prediction satisfies a threshold probability associated with the user reaction.

16. The computing device of claim 14, wherein the user reaction prediction model is trained to output the user reaction prediction indicating a probability of the user reaction being a positive or negative user sentiment.

17. The computing device of claim 14, wherein the user reaction prediction model is trained to output the user reaction prediction indicating a probability of the user emotion.

* * * * *